United States Patent
Cheng et al.

(10) Patent No.: US 9,906,038 B2
(45) Date of Patent: *Feb. 27, 2018

(54) SMART RENEWABLE POWER GENERATION SYSTEM WITH GRID AND DC SOURCE FLEXIBILITY

(71) Applicant: CyboEnergy, Inc., Rancho Cordova, CA (US)

(72) Inventors: George Shu-Xing Cheng, Folsom, CA (US); Steven L. Mulkey, Cameron Park, CA (US)

(73) Assignee: CyboEnergy, Inc., Rancho Cordova, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/009,658

(22) Filed: Jan. 28, 2016

(65) Prior Publication Data

US 2016/0226254 A1 Aug. 4, 2016

Related U.S. Application Data

(60) Provisional application No. 62/109,427, filed on Jan. 29, 2015.

(51) Int. Cl.
*H02J 3/38* (2006.01)
*H02J 7/35* (2006.01)
*H02J 1/10* (2006.01)

(52) U.S. Cl.
CPC .............. *H02J 3/383* (2013.01); *H02J 1/10* (2013.01); *H02J 3/382* (2013.01); *H02J 7/35* (2013.01); *Y02B 10/14* (2013.01); *Y02B 10/30* (2013.01); *Y02E 10/563* (2013.01); *Y02E 10/566* (2013.01)

(58) Field of Classification Search
CPC ...... H02J 3/383; H02J 7/35; H02J 1/10; H02J 3/382; Y02B 10/14; Y02B 10/30; Y02E 10/563; Y02E 10/566
USPC .......................................................... 307/25
See application file for complete search history.

(56) References Cited

U.S. PATENT DOCUMENTS

| | | | | |
|---|---|---|---|---|
| 6,134,124 A | * | 10/2000 | Jungreis | H02J 3/32 363/34 |
| 2008/0283118 A1 | * | 11/2008 | Rotzoll | H02M 7/003 136/251 |
| 2010/0043781 A1 | * | 2/2010 | Jones | F24J 2/5237 126/704 |

(Continued)

*Primary Examiner* — Daniel Kessie
(74) *Attorney, Agent, or Firm* — Donald E. Stout; Stout, Uxa & Buyan, LLP

(57) ABSTRACT

A method and apparatus is disclosed relating to smart renewable power generation systems with grid and DC source flexibility that can (1) intelligently and selectively pull power from one or multiple DC sources including solar panels, wind generators, and batteries based on certain criteria; (2) invert DC power to AC power; (3) supply the AC power to the electric grid or to an off-grid electric circuit to power AC loads; (4) supply DC power through one or multiple DC output ports to power DC loads; and (5) charge batteries. Various types of on-grid, off-grid, and on/off-grid DC flexible power inverters are described to demonstrate the innovation for delivering flexible, cost-effective, and user-friendly power generation systems to harvest any form of renewable energy available and convert it to usable electricity.

13 Claims, 16 Drawing Sheets

(56) References Cited

U.S. PATENT DOCUMENTS

| | | | |
|---|---|---|---|
| 2011/0012430 A1* | 1/2011 | Cheng | H01L 31/02021 307/82 |
| 2013/0043826 A1* | 2/2013 | Workman | H01M 2/0245 320/101 |
| 2013/0207466 A1* | 8/2013 | Lee | H02J 4/00 307/23 |
| 2015/0256031 A1* | 9/2015 | Raghavan | H02J 13/0003 307/24 |
| 2016/0006251 A1* | 1/2016 | Modeer | H02J 3/28 307/52 |

* cited by examiner

US 9,906,038 B2

SMART RENEWABLE POWER GENERATION SYSTEM WITH GRID AND DC SOURCE FLEXIBILITY

This application claims priority to U.S. Provisional Application No. 62/109,427 filed on Jan. 28, 2015, which is herein incorporated by reference.

The subject of this patent relates to renewable electric power generation and DC (direct current) to AC (alternating current) power inverters that invert DC power from single or multiple DC sources to single-phase or three-phase AC power, where the DC sources include but are not limited to photovoltaic (PV) solar modules or panels, PV cells, PV materials, PV thin films, fuel cells, batteries, wind generators, bio-fuel generators, and other DC power generators. More particularly, this patent relates to smart renewable power generation systems with grid and DC source flexibility that can (1) intelligently and selectively pull power from one or multiple DC sources based on certain criteria; (2) invert DC power to AC power; (3) supply the AC power to the electric grid or to an off-grid electric circuit to power AC loads; (4) supply DC power through one or multiple DC output ports to power DC loads; and (5) charge batteries. The DC source selection criteria are implemented in computer software, which is configurable to achieve desirable functions for a specific application.

In the U.S. Pat. No. 8,786,133, the entirety of which is hereby incorporated by reference, we described the novel Smart and Scalable Power Inverters and the unique scalable design so that the DC to AC power inversion system can include as few as one inverter and one DC source, up to a selected number of inverters and multiple DC sources. A number of smart single-input, dual-input, triple-input, quad-input, and multiple-input power inverters in a mixed variety can easily connect to single, dual, triple, quad, and multiple DC power sources, invert the DC power to AC power, and daisy chain together to generate a total power, which is equal to the summation of the AC power supplied by each smart and scalable power inverter.

In the U.S. patent application Ser. No. 13/493,622, the entirety of which is hereby incorporated by reference, we described the Smart and Scalable Off-Grid Mini-Inverters having one or multiple DC input channels that can invert DC power to AC power, and supply AC power to power electrical devices including motors, pumps, fans, lights, appliances, and homes.

In the U.S. patent application Ser. No. 13/537,206, the entirety of which is hereby incorporated by reference, we described an enclosure design to accommodate and support the unique features and capabilities of the Smart and Scalable Power Mini-Inverters that have multiple input channels, and a messaging system using LEDs mounted on the enclosure to indicate the system status of the Smart and Scalable Mini-Inverters.

In the U.S. patent application Ser. No. 13/789,637, the entirety of which is hereby incorporated by reference, we described a method and apparatus for maximizing power production for solar power systems when there is low sunlight during sunrise, sunset, clouding, partial shading, and other low irradiance conditions. A multiple-channel solar power Mini-Inverter can work in the low power mode when there is low sunlight, take power from one solar module to supply DC power to its internal electronic circuits, and also invert the DC power from the remaining connected solar modules to AC power feeding to the electric grid or powering AC loads.

In the U.S. patent application Ser. No. 13/844,484, the entirety of which is hereby incorporated by reference, we described a method and apparatus that can monitor the solar power inverters in real-time both day and night, and generate surveillance alarms and actions when a solar power inverter is removed or disconnected from the AC powerline for no good reason. It offers a low cost and reliable surveillance means to help guard a residential, commercial, or utility-scale solar power system in real-time.

In the U.S. patent application Ser. No. 13/846,708, the entirety of which is hereby incorporated by reference, we described a method and apparatus for solar power generation when irradiance changes quickly or is very low due to sunrise, sunset, clouding, partial shading, warped PV surfaces, moving solar modules, and other low or varying irradiance conditions. A multi-channel solar power inverter connected to multiple solar modules can work in a "Lunar Power Mode", inverting DC power induced from the sky, street lights, or surrounding environment to AC power.

In the U.S. patent application No. 62/087,644, the entirety of which is hereby incorporated by reference, we described a method and apparatus that can intelligently invert DC power from single or multiple DC sources to single-phase or three-phase AC power, supply the AC power to the electric power grid when the grid is on, or supply AC power to electric devices or loads when the grid is down. A Smart and Grid flexible Power Inverter, or On/Off-Grid Power Inverter, is disclosed that can work in either the on-grid or off-grid mode, and switch back and forth between the two modes manually or automatically depending on the power grid conditions.

In this patent, we disclose renewable power generation systems with grid and DC source flexibility. In the accompanying drawing.

Figure 6:
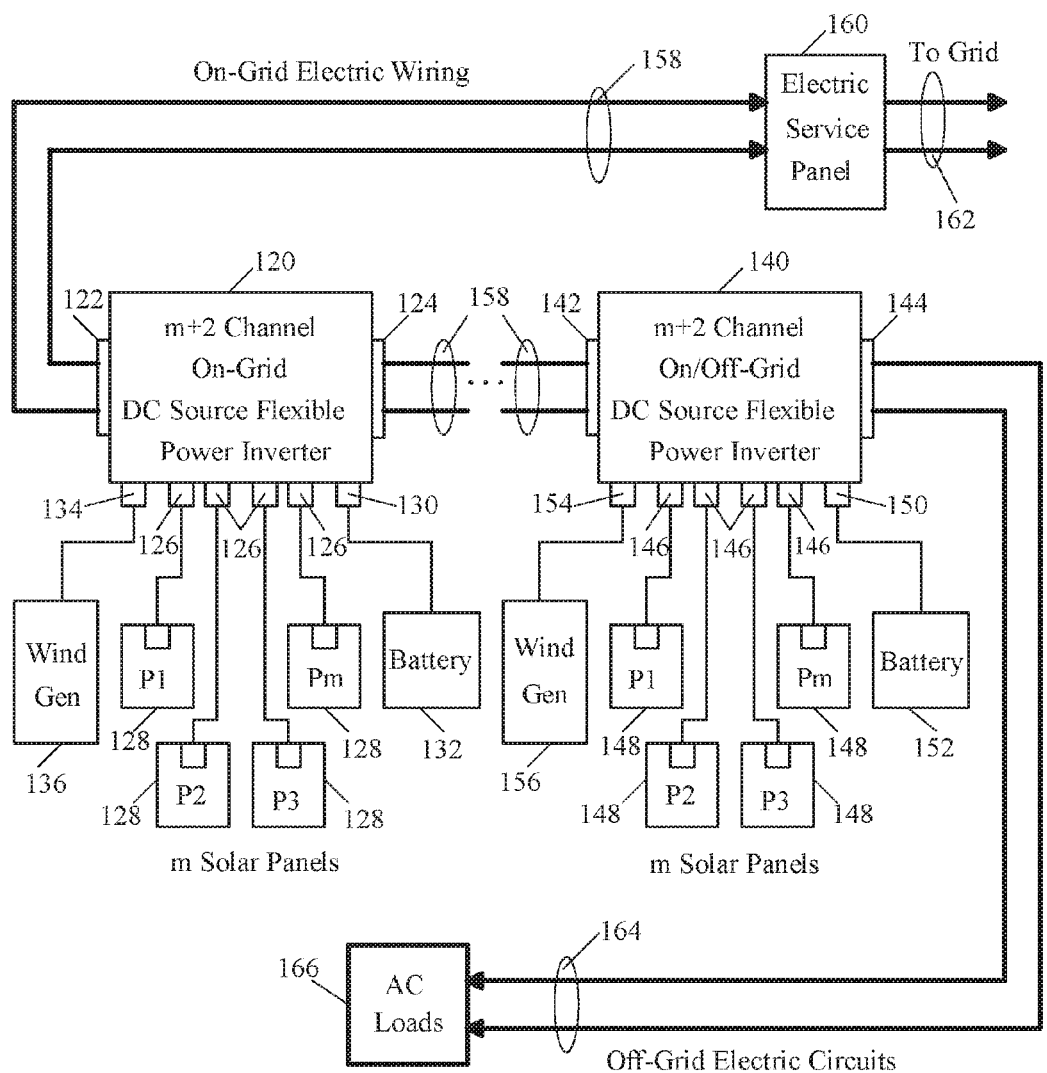

FIG. 6 is a block diagram illustrating a combined on-grid and on/off-grid, DC source flexible power generation system where one m+2 channel on-grid DC flexible power inverter and one m+2 channel on/off-grid DC flexible power inverter daisy-chain to form a group, each inverter is connected to m solar panels, a battery set, and a wind generator through corresponding DC input channels, according to an embodiment of this invention.

Figure 7:
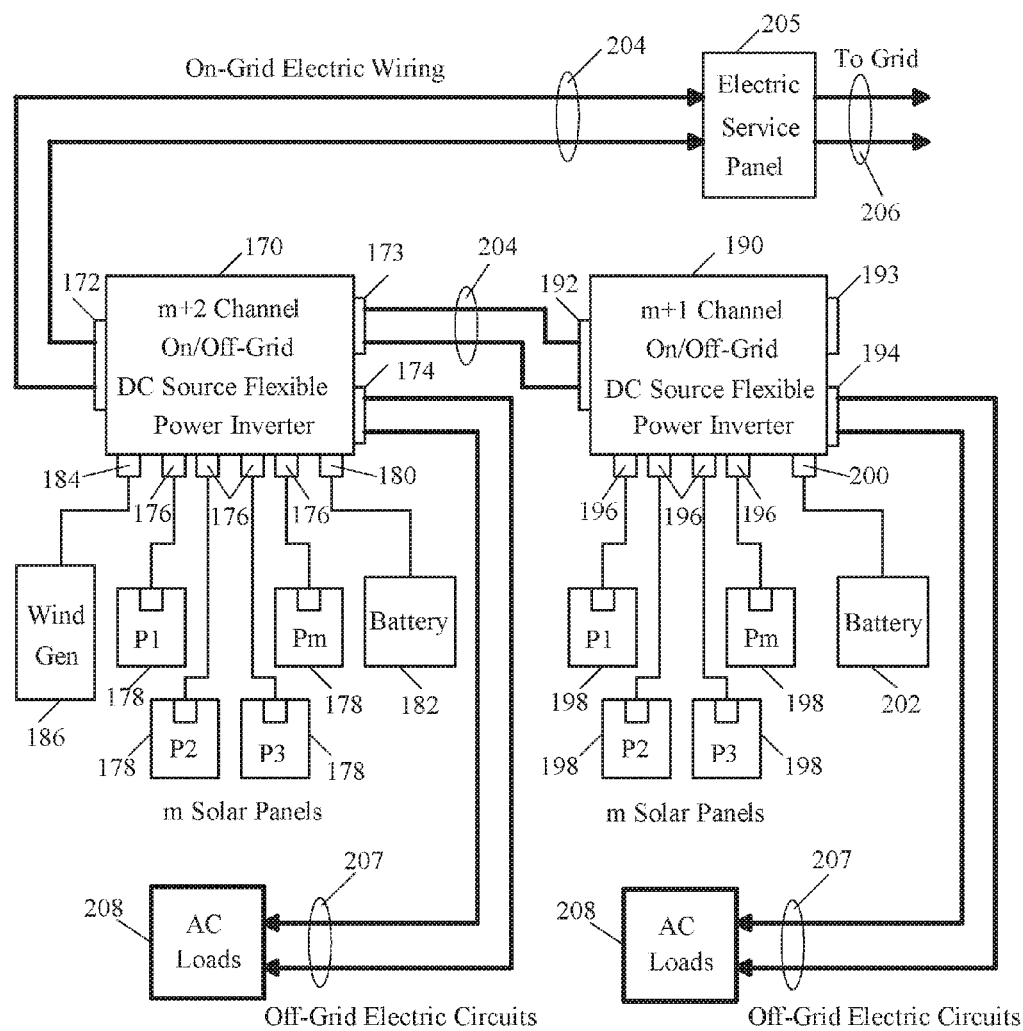

FIG. 7 is a block diagram illustrating a grid flexible and DC source flexible power generation system where one m+2 channel and one m+1 on/off-grid DC flexible power inverters daisy-chain to form a group, each inverter is connected to m solar panels and a battery set, and the m+2 inverter also connects to a wind generator, according to an embodiment of this invention.

Figure 8:
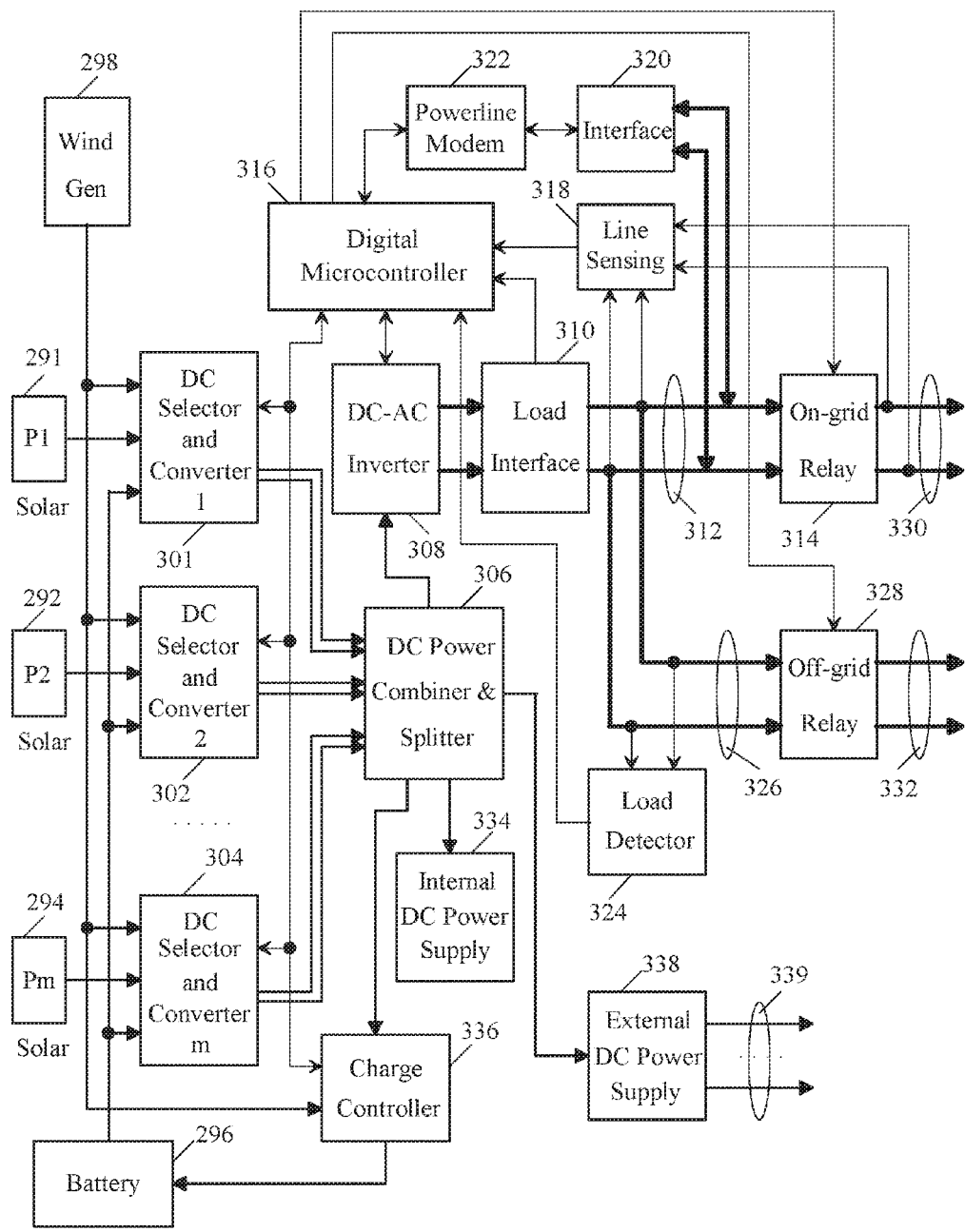

FIG. 8 is a block diagram illustrating a m+2 channel on/off-grid DC source flexible power inverter that is connected to m solar panels, a battery set, and a wind generator through corresponding DC input channels, according to an embodiment of this invention.

Figure 9:
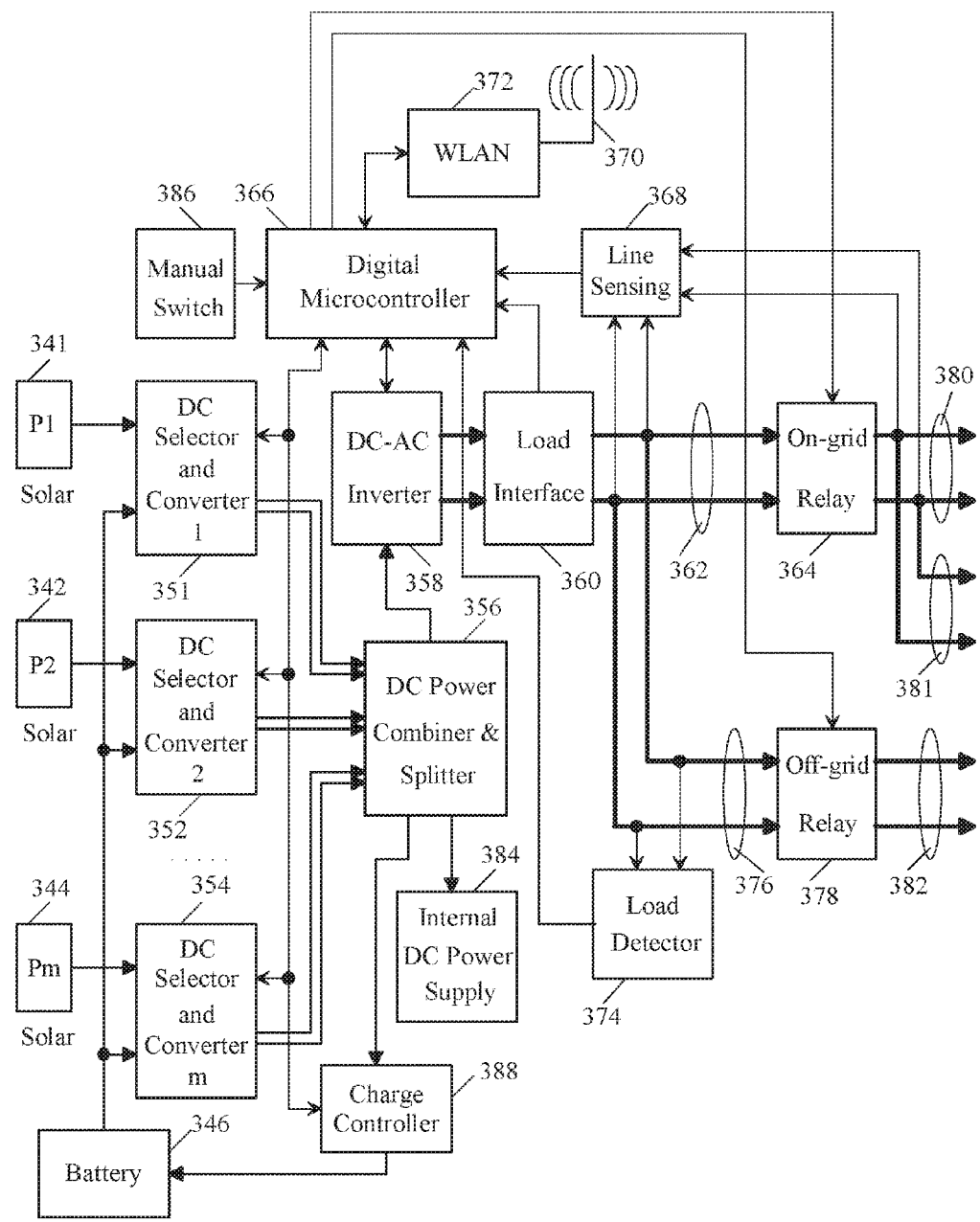

FIG. 9 is a block diagram illustrating a m+1 channel on/off-grid DC source flexible power inverter that is connected to m solar panels and a battery set through corresponding DC input channels, according to an embodiment of this invention.

Figure 10:
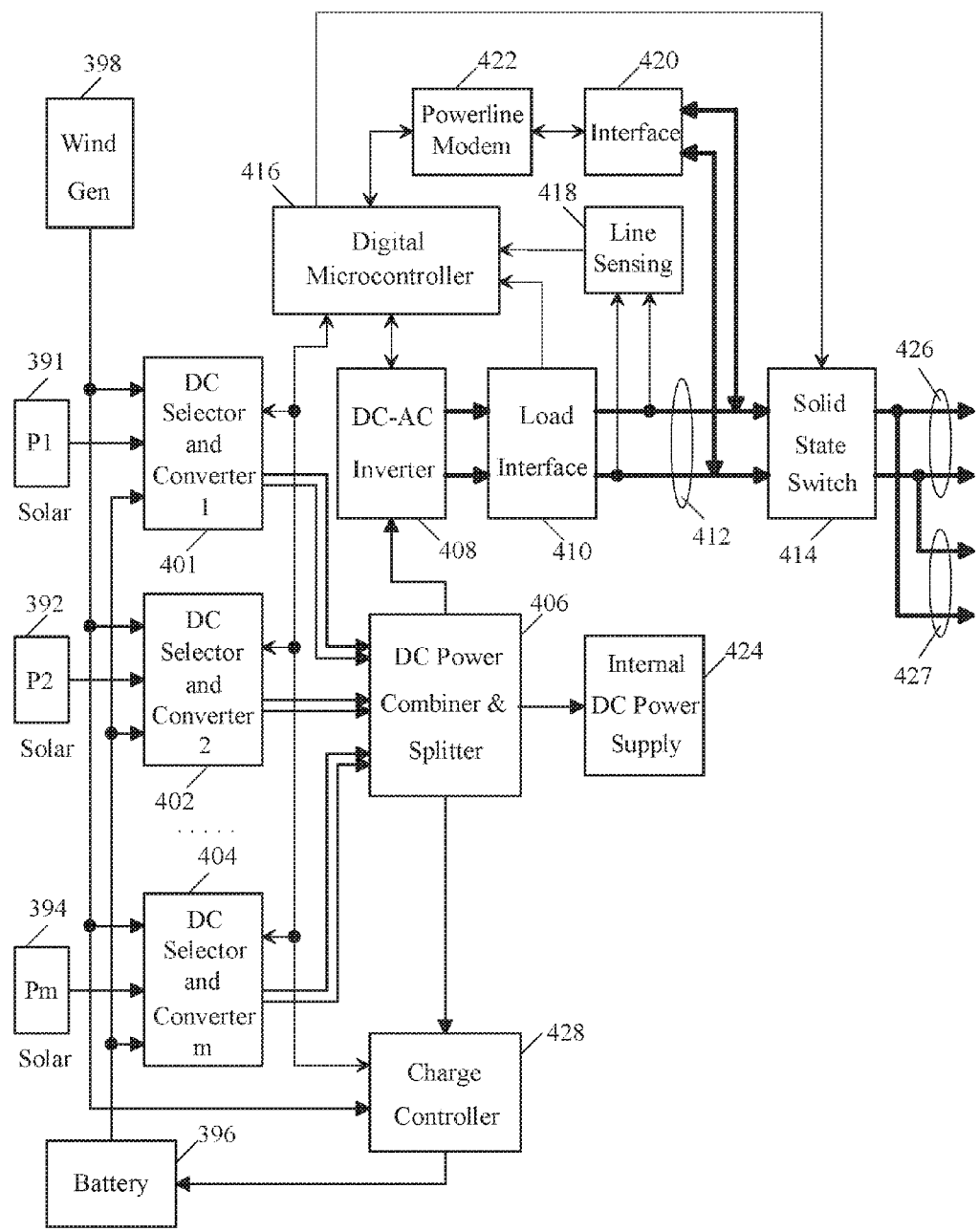

FIG. 10 is a block diagram illustrating a m+2 channel DC source flexible on-grid power inverter that is connected to m solar panels, a battery set, and a wind generator through corresponding DC input channels, according to an embodiment of this invention.

Figure 11:
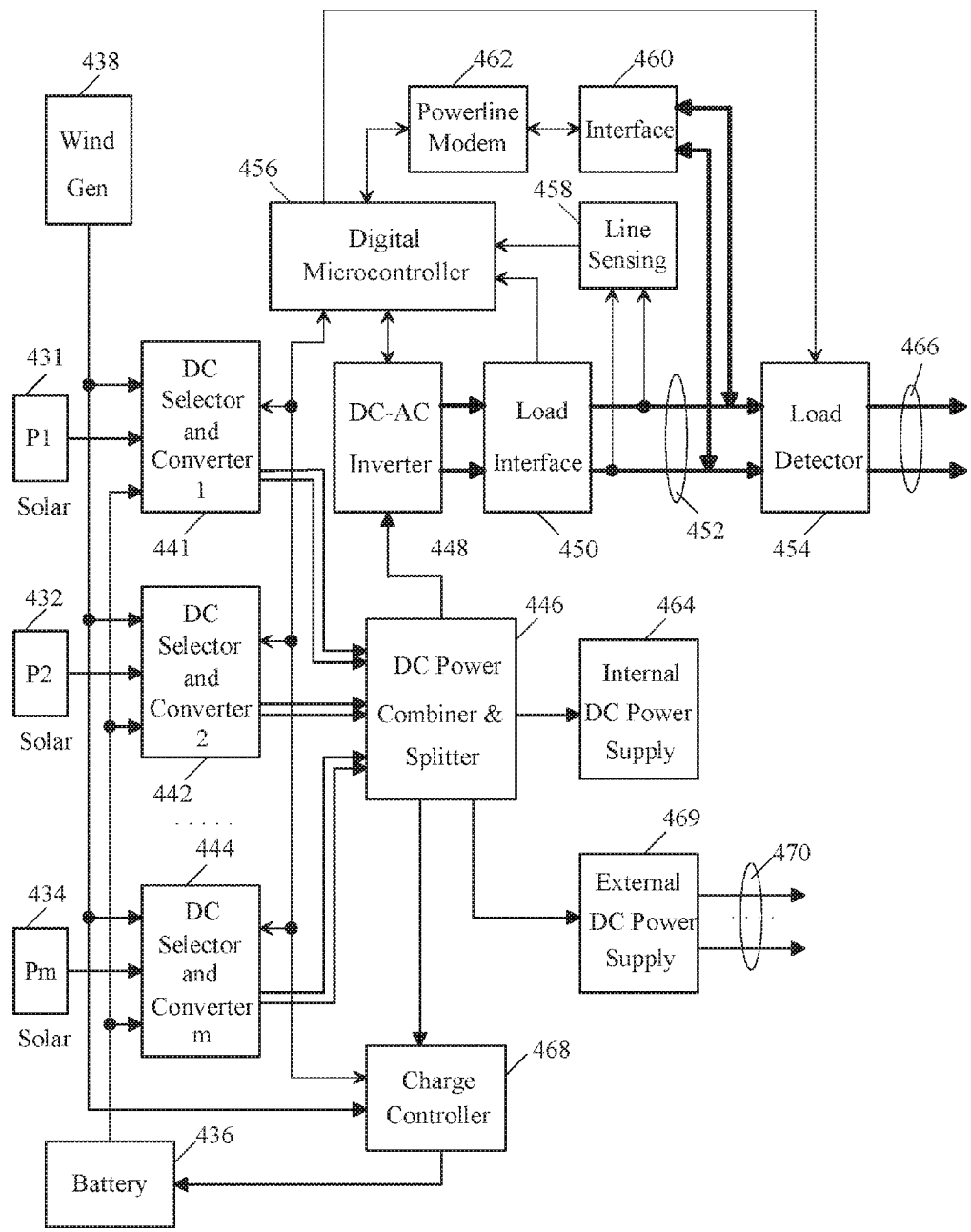

FIG. 11 is a block diagram illustrating a m+2 channel DC source flexible off-grid power inverter that is connected to on solar panels, a battery set, and a wind generator through corresponding DC input channels, according to an embodiment of this invention.

Figure 12:
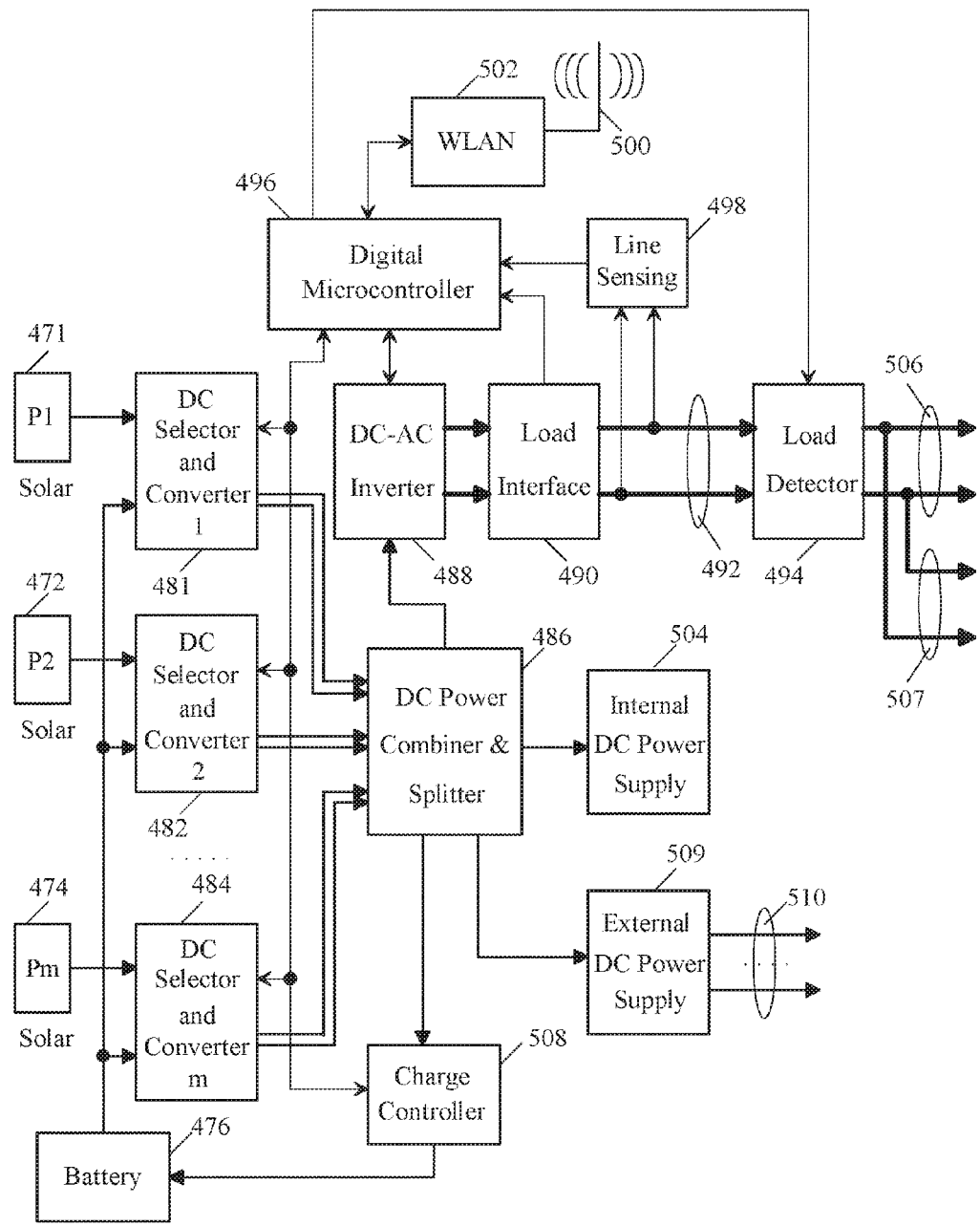

FIG. 12 is a block diagram illustrating a m+1 channel off-grid DC source flexible power inverter that is connected to m solar panels and a battery set through corresponding DC input channels, according to an embodiment of this invention.

Figure 13:
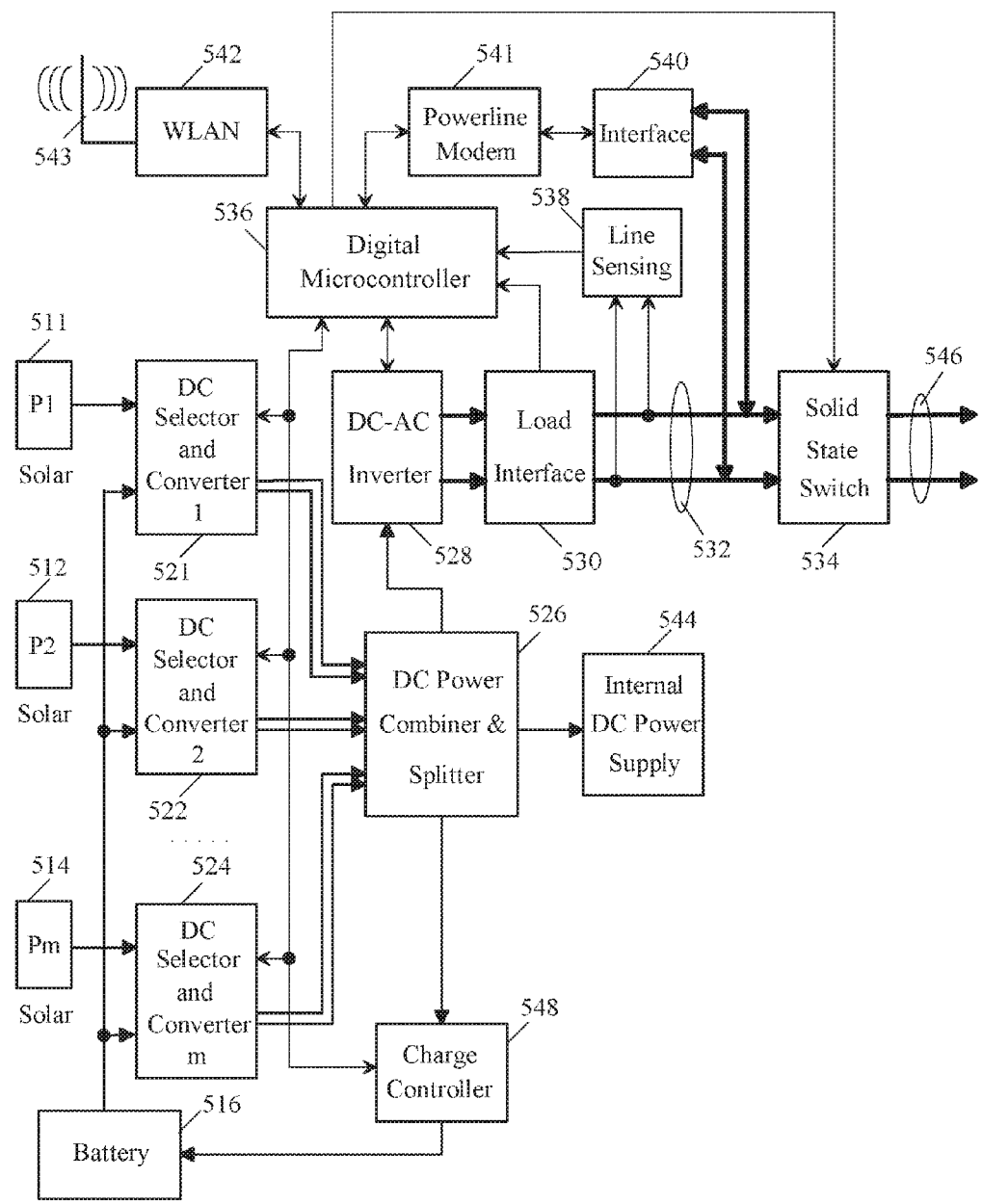

FIG. 13 is a block diagram illustrating a m+1 channel DC source flexible on-grid power inverter that is connected to m solar panels and a battery set through corresponding DC input channels, according to an embodiment of this invention.

Figure 14:
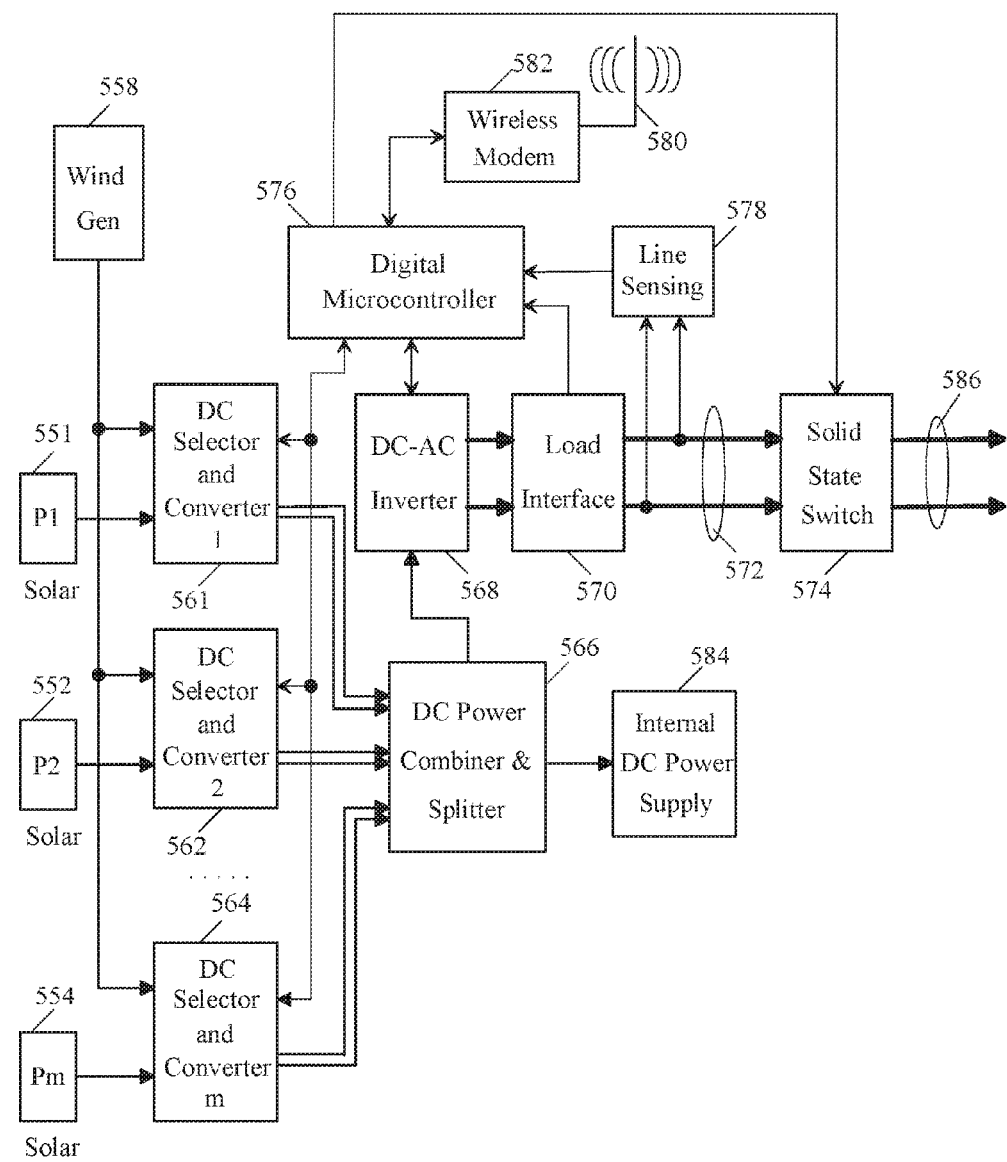

FIG. 14 is a block diagram illustrating a m+1 channel DC source flexible on-grid power inverter that is connected to in solar panels and a wind generator through corresponding DC input channels, according to an embodiment of this invention.

Figure 15:
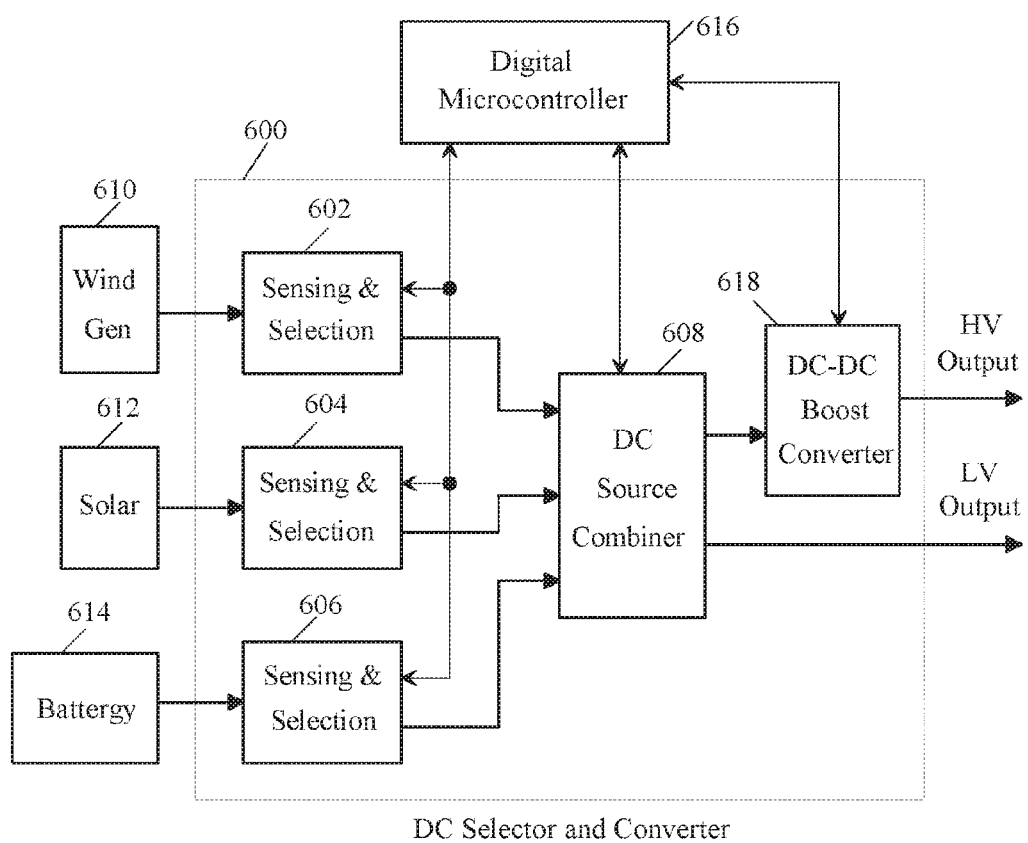

FIG. 15 is a block diagram illustrating a DC selector and converter mechanism, according to an embodiment of this invention.

Figure 16:
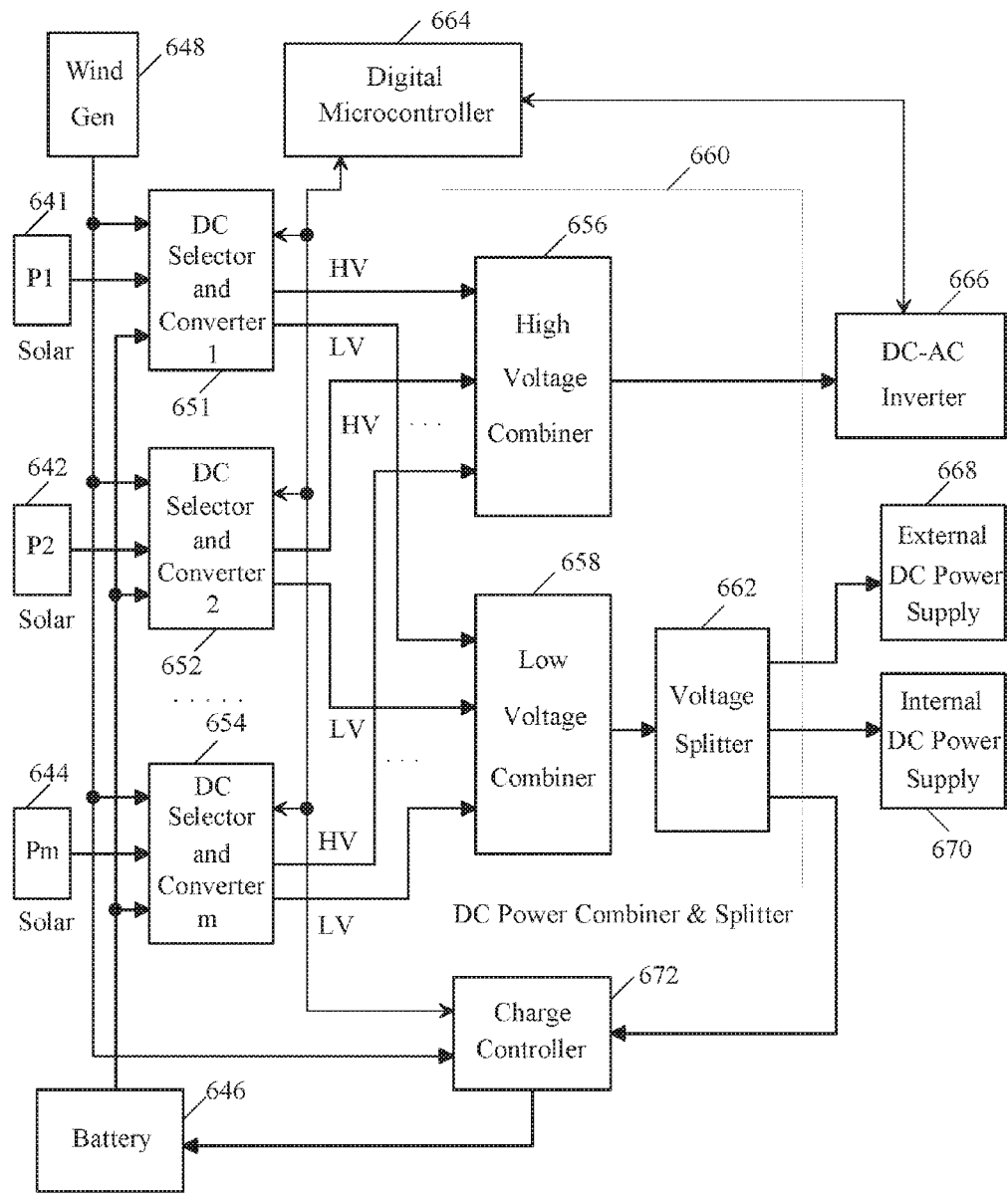

FIG. 16 is a block diagram illustrating a DC power combiner and splitter mechanism, according to an embodiment of this invention.

Figure 17:
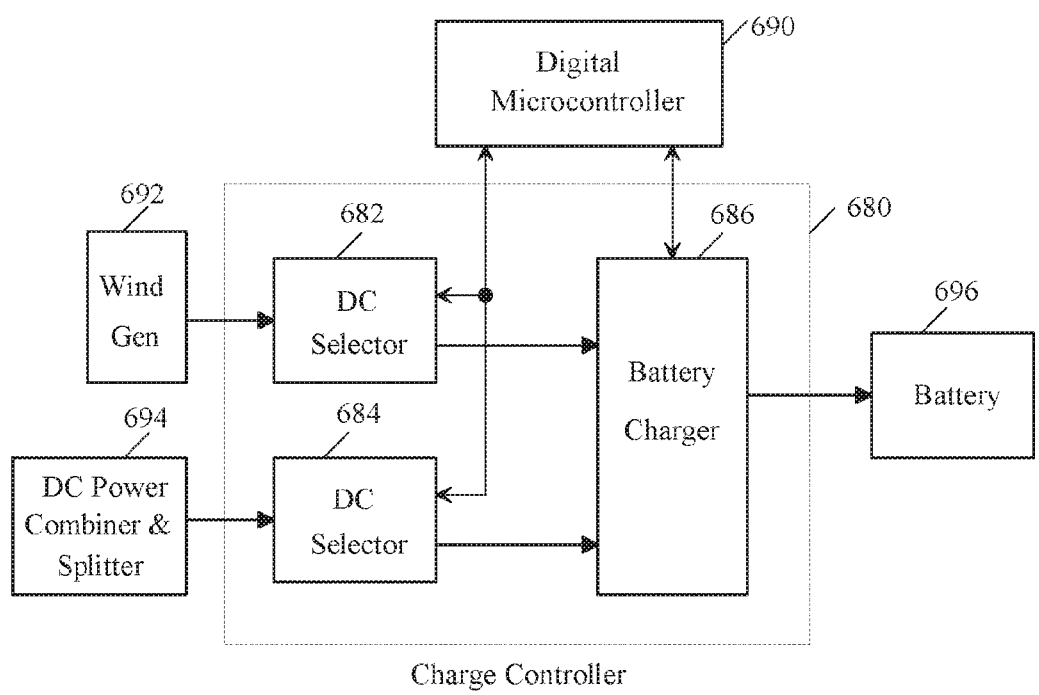

FIG. 17 is a block diagram illustrating a battery charge controller with one or multiple DC inputs, according to an embodiment of this invention.

The term "mechanism" is used herein to represent hardware, software, or any combination thereof. The term "solar panel" or "solar module" refers to photovoltaic (PV) solar modules. The term "AC load" is used herein to represent one or more single-phase or three-phase electrical devices including but not limited to motors, pumps, fans, lights, appliances, and homes.

Throughout this document, m=1, 2, 3, . . . , as an integer, which is used to indicate the number of the DC input ports of an inverter. The term "input channel" refers to the DC input port of the inverter. Then, a m-channel inverter means that the inverter has in input channels or m DC input ports.

The term "m-channel inverter" refers to an inverter that has m input channels, where m=1, 2, 3, . . . , as an integer.

Throughout this document, a DC source can be in any one of the following forms including a solar panel or a set of solar panels combined in series and/or parallel, a battery or a set of batteries combined in series and/or parallel, a fuel cell or a set of fuel cells combined in series and/or parallel, a wind generator, and other types of DC power generators. If a power inverter is used to generate single-phase AC, it can also be applied to three-phase AC without departing from the spirit or scope of our invention. If a solar inverter is used to generate three-phase AC, it can also be applied to single-phase AC without departing from the spirit or scope of our invention. The AC power and related electric grid and AC load can be either single-phase, split-phase, or three-phase.

Without losing generality, all numerical values given in this patent are examples. Other values can be used without departing from the spirit or scope of our invention. The description of specific embodiments herein is for demonstration purposes and in no way limits the scope of this disclosure to exclude other not specially described embodiments of this invention.

DESCRIPTION

In 2014, the most widespread epidemic of Ebola virus disease in history has been ongoing in several West African countries. It has caused significant mortality with a reported 71% case fatality rate. Most of the seriously affected areas have limited access to running water and soap needed to help control the spread of disease. While this patent is being written, an associate is traveling in West Africa, trying to install solar power systems to help meet the urgent demand. He witnessed the devastation and lack of infrastructure including electricity and running water. Basically, people need electricity and water in any form that they can get. So the demand is high and the motivation is clear. The question is how can we build and supply simple and flexible power generation systems to keep the lights on and vaccines refrigerated in clinics that have no electricity.

In this patent, we disclose smart renewable power generation systems with grid and DC source flexibility to harvest any form of renewable energy available and convert it to usable electricity.

Figure 1:
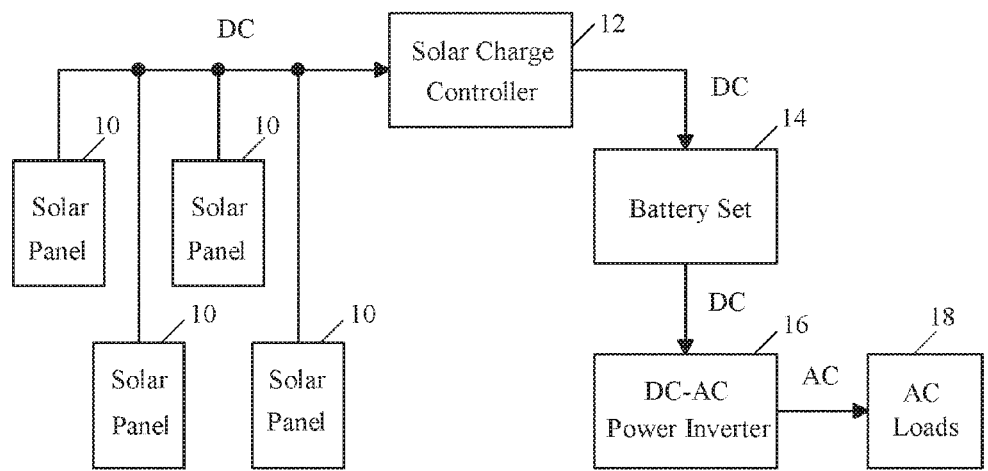
FIG. 1 is a block diagram illustrating a traditional off-grid solar power system as prior art, where the battery is a necessary component of the system.

FIG. 1 is a block diagram illustrating a traditional off-grid solar power system, as prior art, where the battery is a necessary component of the system. The system comprises multiple solar panels 10, a solar charge controller 12, a single battery or a battery set 14, a DC-AC power inverter 16, and AC loads 18.

A battery set is a set of batteries that are connected in parallel and/or in series to provide higher DC voltage and current. For instance, three 12V batteries can be connected in series to become a 36V battery. The solar panels are combined in series and/or parallel to supply DC power to the solar charge controller which connects to the battery set for charging. The solar charge controller takes DC power from the solar panels and charges the batteries. The DC-AC power inverter takes DC power from the battery set, inverts the DC to AC power, and outputs AC to power the AC loads.

Figure 2:
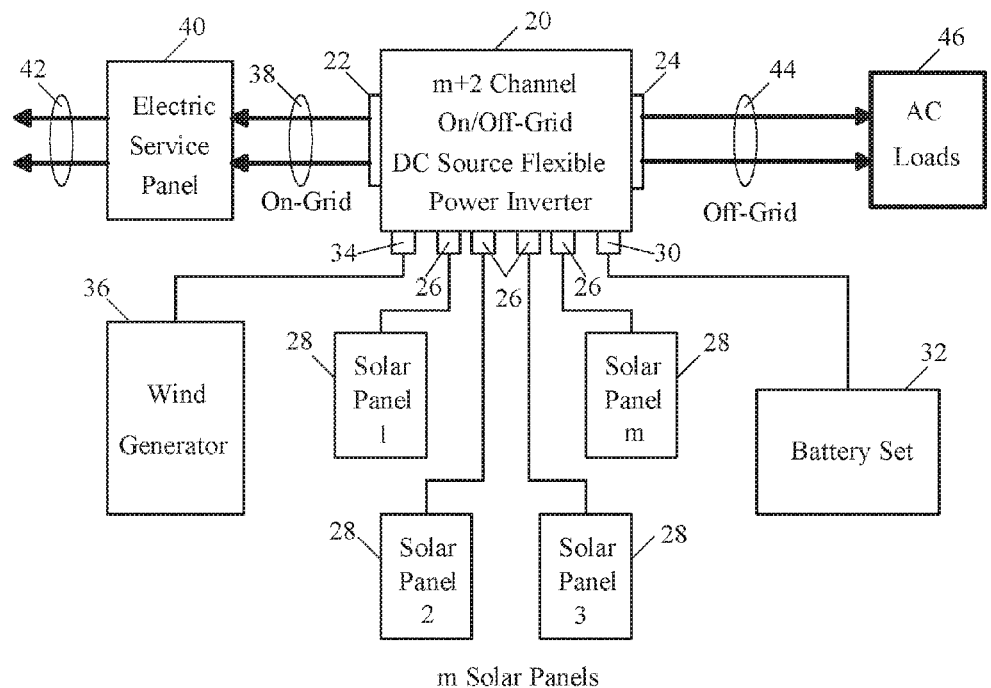
FIG. 2 is a block diagram illustrating a grid flexible and DC source flexible power generation system where one m+2 channel on/off-grid DC source flexible power inverter is connected to in solar panels, a battery set, and a wind generator through corresponding DC input channels, according to an embodiment of this invention.

FIG. 2 is a block diagram illustrating a grid flexible and DC source flexible power generation system where one m+2 channel on/off-grid DC source flexible power inverter is connected to m solar panels, a battery set, and a wind generator through corresponding DC input channels, according to an embodiment of this invention.

The system comprises a m+2 channel on/off-grid DC flexible power inverter 20, an inverter's on-grid AC power output port 22, an inverter's off-grid AC power output port 24, inverter's multiple DC input channels 26 that connect to m solar panels 28, respectively, an inverter's battery input channel 30 that connects to a battery set 32, and an inverter's wind power input channel 34 that connects to a wind generator 36. In addition, the system comprises an on-grid AC powerline 38, an electric service panel 40, a power grid 42, an off-grid AC powerline 44, and AC loads 46.

In this grid and DC source flexible power generation system, the on/off-grid DC flexible power inverter can (1) intelligently and selectively pull power from the solar panels, wind generator, and battery based on certain criteria; (2) invert DC power from one or multiple DC sources to AC power; (3) supply the AC power to the electric grid or to an off-grid electric circuit to power electric devices; and (4) charge the battery. As an on/off-grid power inverter, it can output the AC power to the electric grid 42 via the AC powerline 38 and the electric service panel 40 while the grid is on, or output AC power to the AC loads 46 via the AC powerline 44 while the grid is down.

In the embodiments herein; the battery charging operation has to meet certain conditions including: (1) the power provided by the solar panels and wind generator is sufficient, and (2) the battery is below a pre-determined level.

In the embodiments herein; the solar panel can be a silicon or thin film type photovoltaic (PV) solar panel or a set of solar panels combined in series and/or parallel; the battery can be a lead-acid, Lithium-Ion, fuel-cell, or other type of battery or a set of batteries combined in series and/or parallel; the wind generator can be any type of wind generators that produce DC power or an AC wind generator whose AC output can be converted to DC using a rectifier device. The wind generator should have over-speed protection mechanism and produce DC power with appropriate voltage, current, and wattage. The AC power and related electric grid as well as AC loads can be single-phase, split-phase, or three-phase. The 2 AC wires 38 and 44 in FIG. 2 and in the other embodiments to be described in this patent are used to show the concept and method.

A smart renewable power generation system with DC source flexibility should include the following functions: (1) pull all available DC power from all solar panels at its maximum power point (MPP); (2) charge the battery if there is excess DC power from the solar panels and/or wind generator; (3) be able to select and pull power from available DC sources based on certain criteria; (4) be able to combine all available DC power from solar, wind, and battery to meet the production demand on the AC side for both on-grid and off-grid applications; and (5) implement the DC source selection criteria in computer software, which is configurable to achieve desirable functions for a specific application.

As an example, in the on-grid mode, the DC source selection criteria can be designed with the following options: (1) maximize the harvest of solar and wind energy and supply the generated AC power to the grid; and (2) charge battery if there is excess wind power which enters the charge controller directly. In the off-grid mode, the DC source selection criteria can be designed with the following options: (3) provide sufficient AC and DC output power to run the connected AC and DC loads without using the battery power; (4) if solar and wind cannot produce sufficient DC power for the system to run the connected loads, pull power from the battery to meet the DC power demand; (5) charge battery if there is sufficient wind power which enters the charge controller directly; and (6) charge battery if there is excess DC power from the solar panels in order to run the connected AC and DC loads.

The essence of the DC source selection criteria is about balancing the input and output power, while achieving the defined objectives. The criteria is implemented in the software running in a digital microcontroller in the power inverter to be described in FIGS. 8 to 14. To determine the DC input power and AC output power, voltage and current sensors for both DC inputs and AC output are installed in the inverter. Power is calculated by multiplying voltage and current. The digital microcontroller uses the DC input and AC output power information to balance the input and output power.

Figure 3:
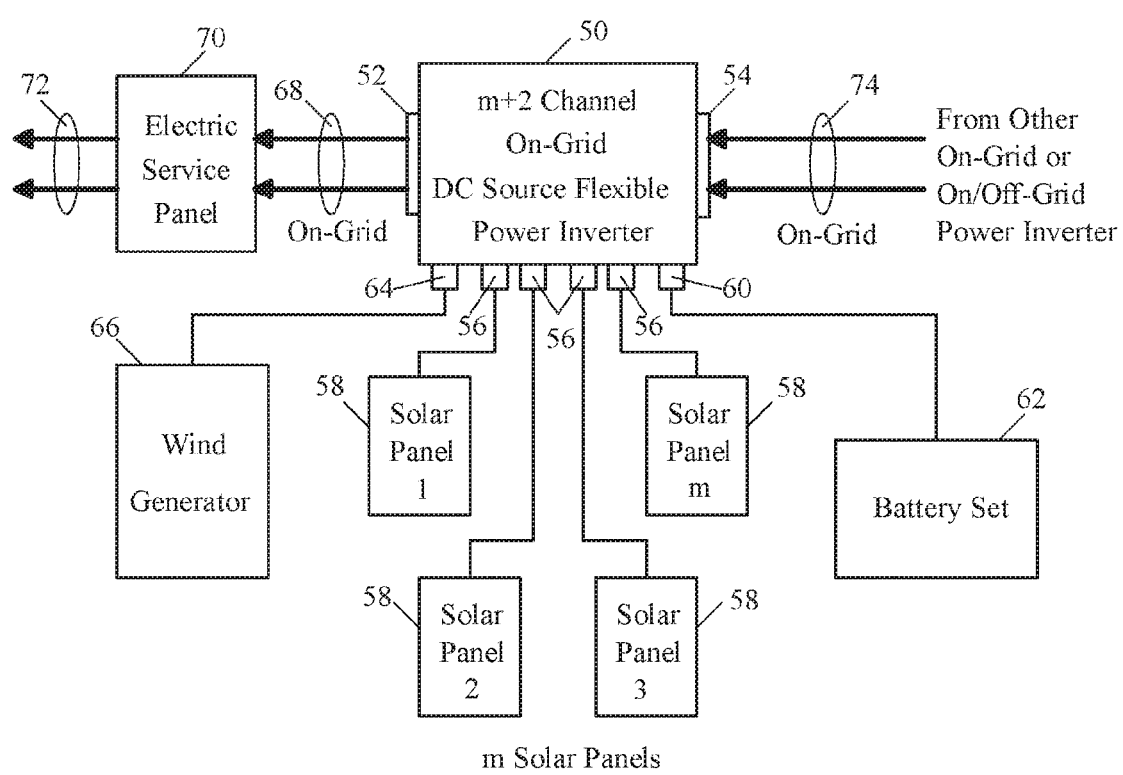
FIG. 3 is a block diagram illustrating an on-grid DC source flexible power generation system where one m+2 channel on-grid DC source flexible power inverter is connected to in solar panels, a battery set, and a wind generator through corresponding DC input channels, according to an embodiment of this invention.

FIG. 3 is a block diagram illustrating an on-grid DC source flexible power generation system where one m+2 channel on-grid DC source flexible power inverter is connected to m solar panels, a battery set, and a wind generator through corresponding DC input channels, according to an embodiment of this invention.

The system comprises a m+2 channel on-grid DC source flexible power inverter 50, an inverter's AC power output port 52, an inverter's AC power input port 54, inverter's multiple DC input channels 56 that connect to in solar panels 58, respectively, an inverter's battery input channel 60 that connects to a battery set 62, and an inverter's wind power input channel 64 that connects to a wind generator 66. In addition, the system comprises an on-grid AC powerline 68, an electric service panel 70, a power grid 72, an on-grid AC powerline 74 that connects AC power input port 54 to the AC outputs from other on-grid or on/off-grid power inverters.

In this on-grid and DC source flexible power generation system, the on-grid DC flexible power inverter can (1) intelligently and selectively pull power from the solar panels, wind generator, and/or battery based on certain criteria; (2) invert DC power from one or multiple DC sources to AC power; (3) supply the AC power to the electric grid 72 via the AC powerline 68 and the electric service panel 70; and (4) charge the battery.

Figure 4:
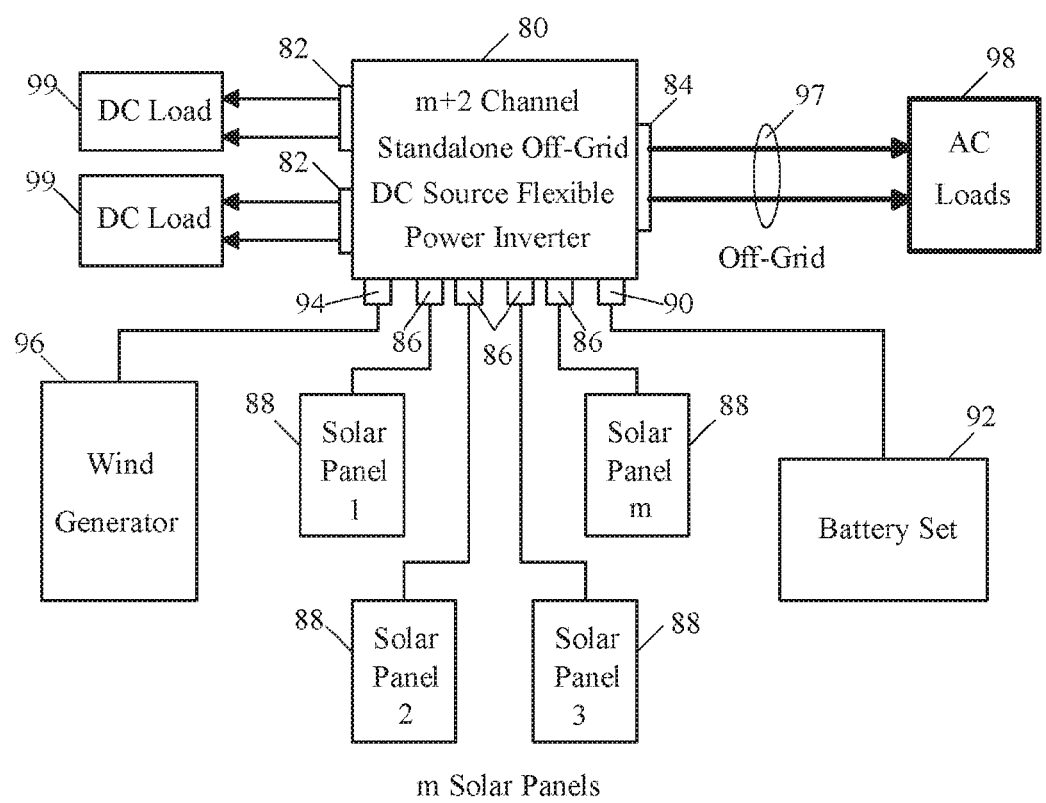
FIG. 4 is a block diagram illustrating an off-grid DC source flexible power generation system where one m+2 channel standalone off-grid DC source flexible power inverter is connected to in solar panels, a battery set, and a wind generator through corresponding DC input channels, according to an embodiment of this invention.

FIG. 4 is a block diagram illustrating an off-grid DC source flexible power generation system where one m+2 channel standalone off-grid DC source flexible power inverter is connected to in solar panels, a battery set, and a wind generator through corresponding DC input channels, according to an embodiment of this invention.

The system comprises a m+2 channel standalone off-grid DC source flexible power inverter 80, two inverter's DC power output ports 82, an inverter's AC power output port 84, inverter's multiple DC input channels 86 that connect to in solar panels 88, respectively, an inverter's battery input channel 90 that connects to a battery set 92, and an inverter's wind power input channel 94 that connects to a wind generator 96. In addition, the system comprises two DC loads 99 that are connected to inverter's DC output ports 82, respectively, and an off-grid AC powerline 97 that connects to inverter's AC output port 84 to supply AC power to AC loads 98.

In this off-grid DC source flexible power generation system, the off-grid DC source flexible power inverter can (1) intelligently and selectively pull power from the solar panels, wind generator, and/or battery based on certain criteria; (2) supply DC power through DC output ports to power one or multiple DC loads; (3) invert DC power from one or multiple DC sources to AC power; (4) supply the AC power to the AC loads; and (5) charge the battery.

This is a simple yet useful off-grid solar power system. Compared with the off-grid solar power system in FIG. 1, it has many features and benefits including: (1) the battery is not a necessary component for the system to be operational so that battery-less off-grid power generation systems can be implemented; (2) when there is sufficient sunlight or wind, the inverter will pull power from the solar panels and/or wind generator to run the AC and DC loads, while leaving the battery idle to extend its life; (3) it can charge the battery if there is sufficient DC power from the solar panels or wind generator; and (4) it can pull power from the battery when more DC power is needed in order to run the connected loads. To conclude, this is a much more powerful and flexible off-grid power generation system that can power AC loads including lights, fans, TVs, computers, battery chargers, refrigerators, motors, pumps, and home appliances as well as DC loads including battery chargers, lights, tools, instruments, DC pumps, DC motors, and other devices requiring DC to run.

Figure 5:
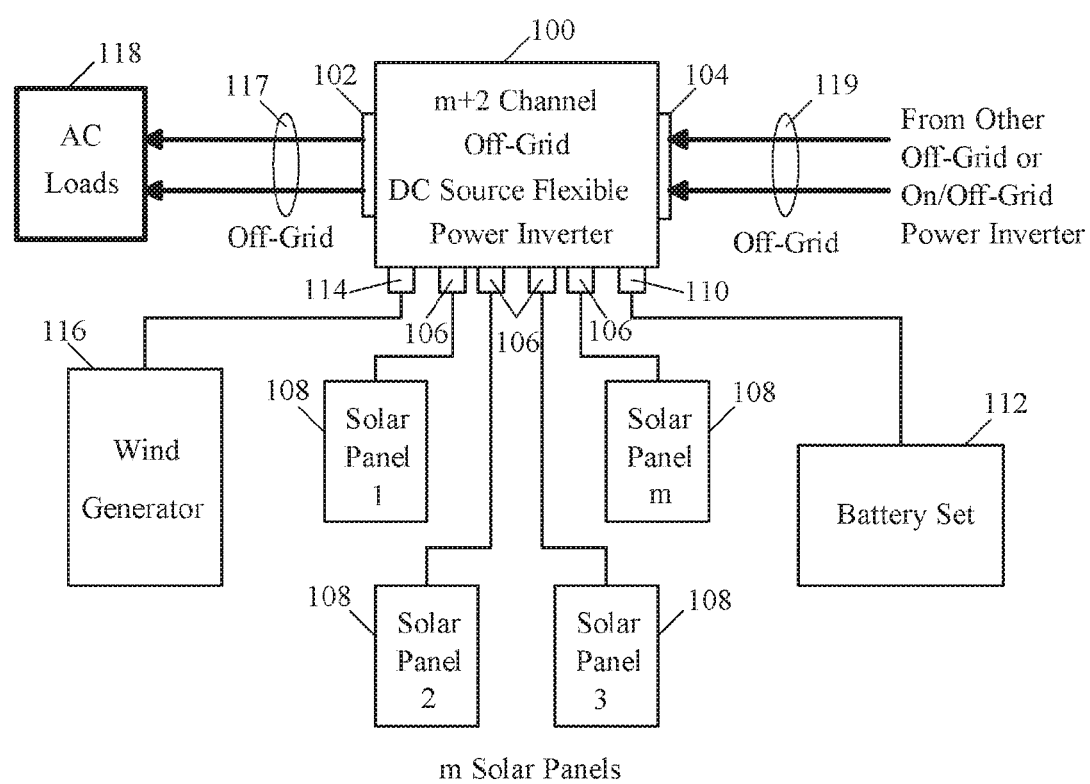
FIG. 5 is a block diagram illustrating an off-grid DC source flexible power generation system where one m+2 channel off-grid DC flexible power inverter is connected to in solar panels, a battery set, and a wind generator through corresponding DC input channels, according to an embodiment of this invention.

FIG. 5 is a block diagram illustrating an off-grid DC source flexible power generation system where one m+2 channel off-grid DC flexible power inverter is connected to m solar panels, a battery set, and a wind generator through corresponding DC input channels, according to an embodiment of this invention.

The system comprises a m+2 channel off-grid DC source flexible power inverter 100, an inverter's AC power output port 102, an inverter's AC power input port 104, inverter's multiple DC input channels 106 that connect to m solar panels 108, respectively, an inverter's battery input channel 110 that connects to a battery set 112, and an inverter's wind power input channel 114 that connects to a wind generator 116. In addition, the system comprises an off-grid AC powerline 117 that connects to the inverter's AC output port 102 to supply AC power to AC loads 118. The system also comprises an off-grid AC powerline 119 that connects other inverter's off-grid AC outputs to the AC input port 104. The off-grid AC input port allows the inverter to daisy-chain with other off-grid or on/off-grid power inverters to form a larger off-grid AC circuit to power AC loads that require more power.

The smart and scalable off-grid power inverters have been described in the U.S. patent application Ser. No. 13/493,622, where multiple off-grid inverters can work together as a group, in which an AC master inverter is the "leading inverter" to generate AC power to the off-grid AC powerline to allow the other off-grid inverters connected to the same AC powerline to synchronize with the AC power being produced by the AC master inverter.

In physical design of a m+2 channel off-grid DC flexible power inverter, the AC input port and AC output port can be constructed by using appropriate AC wires and connectors to make the installation more user-friendly. For instance, the AC output port can use a male-type AC connector and the AC input port can use a female-type AC connector, which make a matching pair. This way, the user can easily make the AC connections and avoid potential errors.

FIG. 6 is a block diagram illustrating a combined on-grid and on/off-grid, DC source flexible power generation system where one or multiple m+2 channel on-grid DC flexible power inverters and one m+2 channel on/off-grid DC flexible power inverter daisy-chain to form a group, each inverter is connected to m solar panels, a battery set, and a wind generator through corresponding DC input channels, according to an embodiment of this invention.

Without losing generality, the system comprises one or more m+2 channel on-grid DC source flexible power inverters 120, each of which has (1) in DC input channels 126 that are connected to m solar panels 128, respectively, (2) a battery channel 130 that is connected to a battery set 132, and (3) a wind channel 134 that is connected to a wind generator 136. The system also comprises a m+2 channel on/off-grid DC source flexible power inverter 140, which has (4) in DC input channels 146 that are connected to m solar panels 148, respectively, (5) a battery channel 150 that is connected to a battery set 152, and (6) a wind channel 154 that is connected to a wind generator 156.

The m-channel on-grid power inverters are disclosed in U.S. Pat. No. 8,786,133 and subsequent patent applications. A m+2 channel on-grid DC source flexible power inverter is similar. It has in input channels that can connect to m DC source such as solar panels. It also has an additional battery channel to connect a battery set and a wind channel to connect to a wind generator. So, it has m+2 input channels.

Each m+2 channel on-grid power inverter 120 comprises an AC output port 122 and an AC input port 124. The on-grid inverters can daisy chain, where the AC output port of an inverter connects to the AC input port of the next inverter, and so on. The first inverter's AC input port is left open, and the last inverter's AC output port is connected to an AC electric service panel so that the generated AC power can be sent to the grid. This method greatly simplifies the wiring job when installing a solar power system.

Although we say the inverters daisy chain, where the AC output port of each inverter is connected to the AC input port of the next inverter, the actual connection of the inverters is pass-through. That means, the generated AC power from each inverter is added in parallel onto the AC powerline.

In FIG. 6, the m+2 channel on/off-grid power inverter 140 comprises an on-grid AC output port 142 and an off-grid AC output port 144. Its on-grid AC output port 142 can daisy-chain with the AC input port 124 of the first on-grid inverter 120. This way, all the inverters are daisy-chained through the on-grid AC powerline 158. The off-grid AC output port 144 of the on/off-grid inverter 140 is connected to an off-grid AC powerline 164 to form an off-grid AC circuit.

In this combined on-grid and on/off-grid DC source flexible power generation system, each inverter takes power from its corresponding DC sources and inverts the DC power to AC power. When the grid is on, the combined AC power from all inverters 120 and 140 is sent to the power grid 162. When the grid is down, the AC power from the off-grid AC output port of the on/off-grid inverter 140 powers the AC loads 166.

Since these DC source flexible power inverters get DC power from solar, battery, and wind, they can be designed to include the following functions: (1) pull all available DC power from all solar panels at its maximum power point (MPP); (2) charge the battery if there is excess DC power from the solar panels and/or wind generator; (3) be able to select and pull power from available DC sources based on certain criteria; (4) be able to combine all available DC power from solar, wind, and battery to meet the production demand on the AC side for both on-grid and off-grid applications; and (5) implement the DC source selection criteria in computer software, which is configurable to achieve desirable functions for a specific application.

FIG. 7 is a block diagram illustrating a grid flexible and DC source flexible power generation system where one m+2 channel and one m+1 on/off-grid DC flexible power inverters daisy-chain to form a group, each inverter is connected to m solar panels and a battery set, and the m+2 inverter also connects to a wind generator, according to an embodiment of this invention.

Without losing generality, the system comprises one m+2 channel on/off-grid DC source flexible power inverter 170, which has (1) in DC input channels 176 that are connected to m solar panels 178, respectively, (2) a battery channel 180 that is connected to a battery set 182, and (3) a wind channel 184 that is connected to a wind generator 186. The system also comprises a m+1 channel on/off-grid DC source flexible power inverter 190, which has (4) in DC input channels 196 that are connected to m solar panels 198, respectively, and (5) a battery channel 200 that is connected to a battery set 202. Notice that the m+1 channel power inverter does not include a wind channel in this case. There can be numerous combination possibilities where different inverters in the same family can be combined to form a group.

In this system, the on/off-grid power inverter 170 comprises an on-grid AC output port 172, and on-grid AC input port 173, and an off-grid AC output port 174. The on/off-grid power inverter 190 comprises an on-grid AC output port 192, and on-grid AC input port 193, and an off-grid AC output port 194. The two inverters can daisy-chain by connecting the AC output port 192 of inverter 190 to the AC input port 173 of inverter 170. Each on/off-grid inverter takes power from its corresponding DC sources, inverts the DC power to AC power, and outputs the AC power through either the on-grid AC output or off-grid AC output port depending on the grid condition. When the grid is on, the combined AC power from all inverters 170 and 190 is sent to the power grid 206 via the AC powerline 204. When the grid is down, the AC power from the off-grid AC output port 174 and 194 of the inverter 170 and 190 powers their corresponding AC loads 208 via the AC powerline 207, respectively. To simplify the drawing, FIG. 7 shows only one inverter for both 170 and 190, although ere can be multiple inverters in the system that are connected in similar ways.

FIG. 8 is a block diagram illustrating a m+2 channel on/off-grid DC source flexible power inverter that is connected to m solar panels, a battery set, and a wind generator through corresponding DC input channels, according to an embodiment of this invention.

The inverter comprises m DC selector and converter circuits 301, 302, . . . , 304, a DC power combiner and splitter 306, a DC-AC inverter 308, a load interface circuit 310, an internal on-grid AC powerline 312, an on-grid electric relay 314, a digital microcontroller 316, a line sensing circuit 318, an interface circuit for powerline communications 320, a powerline communications Modem 322, a load detector 324, an internal off-grid AC powerline 326, an off-grid electric relay 328, an external on-grid AC powerline 330, an external off-grid AC powerline 332, an internal DC power supply 334, a battery charge controller 336, an external DC power supply 338, and DC output circuits 339. The external on-grid AC powerline 330 is connected to an electric grid, and the external off-grid AC powerline 332 is connected to an off-grid AC circuit.

A smart on/off-grid power inverter is disclosed in the U.S. patent application No. 62/087,644 that can work in either the on-grid or off-grid mode, and switch back and forth between the two modes manually or automatically depending on the power grid conditions. The m+2 channel on/off-grid DC source flexible power inverter works similarly but includes additional features and capabilities.

During normal operating conditions, the power from solar panels 291, 292, . . . , 294 is delivered to the corresponding DC selector and converter 301, 302, . . . , 304 respectively. The power from wind generator 298 can enter the DC selector and converter 301, 302, . . . , 304 simultaneously as the wind generator's DC output is connected to each of the converters in parallel. The power from battery 296 can also enter the DC selector and converter 301, 302, . . . , 304 simultaneously as its DC output is connected to each of the converters in parallel. The drawings in FIGS. 2 to 7 show that there are only one battery channel and one wind channel, which reflect this design.

Each DC selector and converter 301, 302, . . . , 304 is controlled by the microcontroller 316 and can select one or more DC sources from solar, wind, and battery depending on the DC selection criteria, which is implemented in the software in microcontroller 316. Each DC selector and converter can pull power from the selected DC sources and combine the power. It then splits the DC power into a high-voltage (HV) and a low-voltage (LV) output. These 2 outputs are connected to the DC power combiner and splitter 306 as illustrated by the 2 lines in FIG. 8. The detailed design for the DC selector and converter 301, 302, . . . , 304, and those to be described in the embodiments herein will be disclosed in FIG. 15.

The DC power combiner and splitter 306 combines the high-voltage DC inputs from all DC selector and converter 301, 302, . . . , 304 and then outputs the total high-voltage DC power to the DC-AC inverter 308. It also combines the low-voltage DC inputs from all DC selector and converter 301, 302, . . . , 304 and then outputs the low-voltage DC power to (1) the internal DC power supply 334, (2) battery charge controller 336, and (3) external DC power supply 338. The internal DC power supply 334 then can supply DC power to the internal electronics. The charge controller 336 can take DC power from the DC power combiner & splitter 306 or from the wind generator 298 directly to charge the battery set 296. The external DC power supply 338 can supply DC power to one or multiple DC loads through the DC output circuits 339. The detailed design for the DC power combiner and splitter 306 and those to be described in the embodiments herein will be disclosed in FIG. 16.

The combined high-voltage DC power enters the DC-AC inverter 308 and then is inverted into AC power. In the on-grid mode, the inverted AC voltage is higher than the incoming AC voltage from the grid. The generated AC power goes through the load interface circuit 310 to be combined with the AC power in the internal AC powerline 312. A line sensing circuit 318 connected to the internal AC powerline 312 is used to detect the phase and zero-crossing point of the incoming AC power from the power grid. The phase and zero-crossing point signals are sent to the microcontroller 316 for AC power synchronization to assure that the power inverter provides high quality synchronized power to the grid. The line sensing circuit 318 is also connected to the external AC powerline 330 to detect the power grid status. In the off-grid mode, the inverted AC voltage is regulated based on the rated off-grid output voltage of the inverter.

The on-grid electric relay 314 controlled by the microcontroller 316 is used to isolate the internal on-grid AC powerline 312 from the external on-grid AC powerline 330. The off-grid electric relay 328 controlled by the microcontroller 316 is used to isolate the internal off-grid AC powerline 326 from the external off-grid AC powerline 332. The internal on-grid AC powerline 312 and internal off-grid AC powerline 326 are connected. However, the AC voltage on the internal powerline 312 and 326 is dependent on whether the inverter is running in the on-grid or off-grid mode. For instance, in the on-grid mode, the internal powerline 312 is 240V, which matches the grid voltage in the U.S. In the off-grid mode, the internal powerline 326 is 120V which is the rated off-grid AC output voltage for the inverter to power 120V AC loads.

During the on-grid mode, the on-grid electric relay 314 is closed and off-grid electric relay 328 is open. The microcontroller 316 keeps detecting if there is grid power from the line sensing circuit 318 connected to the internal on-grid AC powerline 312. If there is grid power, it will continue to send power to the grid. As soon as it detects the grid is down, it will stop generating power within a fraction of a second based on the UL1741 requirement. Then, the microcontroller sends a signal to disconnect the on-grid electric relay 314. After waiting for a few seconds, the microcontroller sends a signal to connect the off-grid electric relay 328. The inverter then starts to send a test signal through the internal off-grid powerline 326 and external off-grid powerline 332 to a connected off-grid AC circuit to check: (1) if there is AC present in the off-grid circuit, and (2) if there is an AC load in the off-grid circuit. If there is no AC present and an AC load is detected, it will start to generate AC power to power the load. Now, the inverter is working in the off-grid mode.

During the off-grid mode, the on-grid electric relay 314 is open and off-grid electric relay 328 is closed. The microcontroller 316 is constantly detecting if there is grid power from the line sensing circuit 318 connected to the external on-grid AC powerline 330. After grid power is detected, the inverter will wait for a few minutes to assure the grid is stable. If the inverter is designed to go back to the on-grid mode automatically, it will first stop generating power to the off-grid circuit. After the microcontroller assures that power generation is halted, it will send a signal to disconnect the off-grid electric relay 328. Then, the microcontroller sends a signal to connect the on-grid electric relay 314. After a 5-minute mandatory waiting period, the inverter starts to generate AC power to be sent to the power grid. Now, the inverter is working in the on-grid mode. The on-grid electric relays and off-grid electric relays to be described in FIG. 9 work the same way as described here.

The load detector 324 as well as the ones to be described in FIGS. 9, 11 and 12 are electronic circuits that can detect the impedance of the connected AC load. If no AC power is detected on the off-grid AC powerline, the load detector checks the impedance of the off-grid AC powerline to determine if the connected AC load is within certain specifications. The load detector in the embodiments herein can be designed using standard LRC meter impedance measurement circuits and mechanism such as those described in the book, "The Measurement of Lumped Parameter Impedance: A Metrology Guide" published by University of Michigan Library in January 1974.

The powerline communications Modem 322 which is isolated by an interface circuit 320 and the Modems to be described in FIGS. 10, 11, and 13 are used to establish a 2-way digital signal communication between the microcontroller and the outside world through the AC powerline. The Powerline Modem that can be used in the embodiments herein can be any of a number of commercially available integrated circuits capable of providing 2-way digital communications through a powerline. Through the 2-way powerline communication, the inverter can receive information such as power dispatch commands from an independent grid system operator (ISO) that manages power grids to ramp its output power up and down. With flexible DC sources from solar, wind, and battery, the smart renewable power generation system can help level the power peaks and valleys to help stabilize the power grid.

The microcontroller 316 and the one to be described in FIG. 9 is used to perform a number of tasks including: (1) monitoring the DC input voltage from solar, wind, and battery; (2) selecting the DC sources based on the DC source selection criteria; (3) monitoring the DC voltages in each of the DC selector and converter circuits; (4) controlling the outputs of each of the DC selector and converter circuits; (5) measuring the input voltage and current, and calculating DC input power for each input channel; (6) performing maximum power point tracking (MITT) for each solar panel; (7) performing DC-AC inversion, AC power synchronization, and AC output current control; (8) monitoring AC current and voltage for generated power amount and status; (9) performing powerline or wireless communications; (10) performing logic controls such as AC powerline switching and isolation; (11) detecting the power grid status; (12) detecting off-grid AC circuit status; (13) switching between on-grid and off-grid mode; and (14) regulating AC output voltage when working in the off-grid mode.

The digital microcontroller 316 as well as those to be described in FIGS. 9 to 14 are small computers on a single integrated circuit (IC) or a set of ICs that consists of a central processing unit (CPU) combined with functions and peripherals including a crystal oscillator, timers, watchdog, serial and analog I/Os, memory modules, pulse-width-modulation (PWM) generators, and user software programs. A 32-bit high-performance floating-point microcontroller is selected for this application. The digital microcontroller in the embodiments herein performs real-time control and optimization functions for the corresponding on-grid, off-grid, and on/off-grid power inverters, in which Model-Free Adaptive (MIA) controllers are used to control the DC converters and inverter's AC outputs for on-grid, off-grid, and on/off-grid applications. The MFA optimizers provide maximum power point tracking (MPPT) to allow the power inverters to achieve optimal power production. The MFA control and optimization technologies have been described in U.S. Pat. Nos. 6,055,524, 6,556,980, 7,142,626, 7,152,052, 7,415,446 and 8,594,813, the contents of all of which are hereby incorporated by reference.

FIG. 9 is a block diagram illustrating a m+1 channel on/off-grid DC source flexible power inverter that is connected to m solar panels and a battery set through corresponding DC input channels, according to an embodiment of this invention.

The inverter comprises m DC selector and converter circuits 351, 352, . . . , 354, a DC power combiner and splitter 356, a DC-AC inverter 358, a load interface circuit 360, an internal on-grid AC powerline 362, an on-grid electric relay 364, a digital microcontroller 366, a line sensing circuit 368, an antenna for wireless communications 370, a wireless LAN (local area network) module 372, a load detector 374, an internal off-grid AC powerline 376, an off-grid electric relay 378, an external on-grid AC powerline 380 and 381, an external off-grid AC powerline 382, an internal DC power supply 384, a 3-position manual switch 386, and a charge controller 388. The external on-grid AC powerline 380 is connected to an electric grid, and the external off-grid AC powerline 382 is connected to an off-grid AC circuit. Notice that this m+1 channel power inverter has a battery input channel but no wind input channel.

The on-grid electric relay 364 controlled by the microcontroller 366 is used to isolate the internal on-grid AC powerline 362 from the external on-grid AC powerline 380. The off-grid electric relay 378 controlled by the microcontroller 366 is used to isolate the internal off-grid AC powerline 376 from the external off-grid AC powerline 382. The internal on-grid AC powerline 362 and internal off-grid AC powerline 376 are connected. However, the AC voltage on the internal powerline 362 and 376 is dependent on whether the inverter is running in the on-grid or off-grid mode.

The 3-position manual switch 386 is used to select the inverter to work in the following positions: (1) auto position, (2) on-grid position, and (3) off-grid position. In the auto position, the microcontroller can switch between the on-grid and off-grid mode based on the grid condition. In the on-grid position, the inverter will work as an on-grid inverter. When the grid is down, it will not switch to the off-grid mode. It must be switched to the off-grid mode manually in order for the inverter to generate power to the AC load. In the off-grid position, the inverter will work like an off-grid inverter regardless of the power grid condition. It must be switched to the on-grid mode manually in order for the inverter to generate power to the grid.

The 3-position manual switch 386 is connected to the microcontroller 366 through signal lines to inform the microcontroller of the selected position. For example, the system can be designed to use 0V, 2.5V, and 3.3V DC signals to switch among the (1) auto position, (2) on-grid position, and (3) off-grid position, respectively.

The DC selectors that can be used in the embodiments herein are any of a number of electric devices to connect and disconnect electric circuits including but not limited to electric relays, contacts, and solid-state switches. The DC converters that can be used in the embodiments herein are any of a number of well known converters described in the "Power Electronics Handbook" edited by Muhammad H. Rashid and published by Academic Press in 2007, the entirety of which is hereby incorporated by reference, including Buck Converter, Boost Converter, Buck-Boost Converter, Super-Lift Luo Converter, and Cascade Boost Converter. The DC-AC inverters that can be used in the embodiments herein are any of a number of well known DC-AC inverters described in the "Power Electronics Handbook" including Half-Bridge Inverter, Full-Bridge Inverter, Bipolar PWM Inverter, Unipolar, PWM Inverter, and Sinusoidal PWM Inverter. The DC combiner used in the embodiments herein can be designed with a circuit that allows the HV outputs and LV outputs from all DC converters to connect in parallel, respectively, so that all related DC currents are added together. The DC splitter used in the embodiments herein can be designed to split and distribute the DC power to the internal and external power supplies as well as the charge controller.

The wireless LAN module that can be used in the embodiments herein can be any of a number of commercially available integrated circuits capable of providing 2-way digital communications through wireless networks. Other modules discussed in the embodiments herein including load interface, solid state switch, line sensing circuit, powerline interface circuit, load detector, on-grid relay, off-grid relay, internal DC power supply, external DC power supply, and battery charge controller can be implemented using one or more known combinations of conventional electronic components such as resisters, capacitors, inductors, sensing circuits, solid-state switches, transformers, diodes, transistors, operational amplifiers, ceramic filters, and integrated circuits (ICs), etc.

FIG. 10 is a block diagram illustrating a m+2 channel DC source flexible on-grid power inverter that is connected to m solar panels, a battery set, and a wind generator through corresponding DC input channels, according to an embodiment of this invention.

The inverter comprises in DC selector and converter circuits 401, 402, . . . , 404, a DC power combiner and splitter 406, a DC-AC inverter 408, a load interface circuit 410, an internal on-grid AC powerline 412, a solid state switch 414, a digital microcontroller 416, a line sensing circuit 418, an interface circuit for powerline communications 420, a powerline communications Modem 422, an internal DC power supply 424, an external AC powerline 426 and 427, and a charge controller 428.

During normal operating conditions, the power from solar panels 391, 392, . . . , 394 is delivered to the corresponding DC selector and converter 401, 402, . . . , 404 respectively. The power from wind generator 398 can enter the DC selector and converter 401, 402, . . . , 404 simultaneously as the wind generator's DC output is connected to each of the converters in parallel. The power from battery 396 can also enter the DC selector and converter 401, 402, . . . , 404 simultaneously as its DC output is connected to each of the converters in parallel.

Each DC selector and converter 401, 402, . . . , 404 is controlled by the microcontroller 416 and can select one or more DC sources from solar, wind, and battery depending on the DC selection criteria. Each DC selector and converter can pull power from the selected DC sources and combine the power. It then splits the DC power into a high-voltage (HV) and a low-voltage (LV) output. These 2 outputs are connected to the DC power combiner and splitter 406.

The microcontroller 416 and the ones to be described in FIGS. 13 and 14 is used to perform a number of tasks including: (1) monitoring the DC input voltage from solar, wind, and battery; (2) selecting the DC sources based on the DC source selection criteria; (3) monitoring the DC voltages in each of the DC selector and converter circuits; (4) controlling the outputs of each of the DC selector and converter circuits; (5) measuring the input voltage and current, and calculating DC input power for each input channel; (6) performing maximum power point tracking (MPPT) for each solar panel; (7) performing DC-AC inversion, AC power synchronization, and AC output current control; (8) monitoring AC current and voltage for generated power amount and status; (9) performing powerline or wireless communications; and (10) performing logic controls such as AC powerline switching and isolation.

The m-channel on-grid power inverters are disclosed in U.S. Pat. No. 8,786,133 and subsequent patent applications. With more DC sources from solar, wind, and battery, the on-grid power generation system can be much more grid friendly. In fact, the system can be used to provide grid stabilization services. Through the 2-way communication via powerline or wireless LAN, the inverter can receive power dispatch commands from an independent grid system operator (ISO) that manages power grids to ramp its output power up and down. With flexible DC sources from solar, wind, and battery, the smart renewable power generation system can help level the power peaks and valleys to help stabilize the power grid.

As an example, the m+2 channel on-grid DC flexible power inverter can be designed based on the following criteria: (1) If there is sufficient solar, pull less power from the wind generator to reduce the wear and tear since it has moving parts; (2) If there is sufficient solar and/or wind power, do not pull power from the battery; (3) charge the battery if there is sufficient wind power which enters the charge controller directly; (4) maximize AC power production if the grid needs power; (5) reduce or stop AC power production if the grid does not allow AC power injection; (6) charge battery if there is excess power from the wind and/or solar, while sending AC power to the grid; (7) if battery is fully charged and grid does not allow AC power injection, generate AC power for the local loads only or simply postpone power production; and (8) use battery to supply DC power to the internal DC power supply to keep the inverter running when there is no sunlight so that the inverter can be ready to pull DC power from the wind generator for AC power production when there is sufficient wind speed.

FIG. 10 illustrates that the same external AC powerline can have 2 pairs of AC wires 426 and 427 connected in parallel to facilitate AC input and output ports for daisy-chaining multiple inverters. That is, the AC output port of an inverter connects to the AC input port of the next inverter, and so on. Although we say the inverters daisy chain, the actual connection of the inverter's AC powerline is in parallel or pass-through, in FIG. 10, the solid-state relay 414, external AC powerline 426, and their supporting circuits can form an AC output port. The solid-state relay 414, external AC powerline 427, and their supporting circuits can form an AC input port. In physical design of an on-grid power inverter, the AC input port and AC output port can be constructed by using appropriate AC wires and connectors to make the installation user-friendly. For instance, the AC output port can use a male-type AC connector and the AC input port can use a female-type AC connector, making a matching pair. This way, the user can easily make the AC connections and avoid potential errors. The drawings of the external AC powerline 380 and 381 in FIGS. 9 and 426 and 427 in FIG. 10 show the concept of how multiple inverters can daisy-chain as illustrated in FIGS. 6 and 7.

FIG. 11 is a block diagram illustrating a m+2 channel DC source flexible off-grid power inverter that is connected to m solar panels, a battery set, and a wind generator through corresponding DC input channels, according to an embodiment of this invention.

The inverter comprises no DC selector and converter circuits 441, 442, . . . , 444, a DC power combiner and splitter 446, a DC-AC inverter 448, a load interface circuit 450, an internal off-grid AC powerline 452, a load detector 454, a digital microcontroller 456, a line sensing circuit 458, an interface circuit for powerline communications 460, a powerline communications Modem 462, an internal DC power supply 464, an external off-grid AC powerline 466, a charge controller 468, an external DC power supply 469, and DC output circuits 470.

During normal operating conditions, the power from solar panels 431, 432, . . . , 434 is delivered to the corresponding DC selector and converter 441, 442, . . . , 444 respectively. The power from wind generator 438 can enter the DC selector and converter 441, 442, . . . , 444 simultaneously as the wind generator's DC output is connected to each of the converters in parallel. The power from battery 436 can also enter the DC selector and converter 441, 442, . . . , 444 simultaneously as its DC output is connected to each of the converters in parallel.

Each DC selector and converter 441, 442, . . . , 444 is controlled by the microcontroller 456 and can select one or more DC sources from solar, wind, and battery depending on the DC selection criteria. DC selector and converter can pull power from the selected DC sources and combine the power. It then splits the DC power into a high-voltage (HV) and a low-voltage (IN) output. These 2 outputs are connected to the DC power combiner and splitter 446.

The microcontroller 456 and the one to be described in FIG. 12 is used to perform a number of tasks including: (1) monitoring the DC input voltage from solar, wind, and battery; (2) selecting the DC sources based on the DC source selection criteria; (3) monitoring the DC voltages in each of the DC selector and converter circuits; (4) controlling the outputs of each of the DC selector and converter circuits; (5) measuring the input voltage and current, and calculating DC input power for each input channel; (6) performing maximum power point tracking (MPPT) for each solar panel; (7) performing DC-AC inversion, AC power synchronization, and AC output current control; (8) monitoring AC current and voltage for generated power amount and status; (9) performing powerline or wireless communications; (10) performing logic controls such as AC powerline switching and isolation; (11) detecting off-grid AC circuit status; and (12) regulating AC output voltage.

Since this is an off-grid DC source flexible power inverter that has both AC and DC outputs to run connected AC and DC loads, the DC selection and power pulling criteria should be different than the on-grid power inverter. For instance, an off-grid DC source flexible power inverter can be designed to include the following functions: (1) pull all available DC power from the wind generator and use only a portion of the solar energy needed to run the AC and DC loads, since it is easier to pull more or less power from solar panels to achieve rapid load balancing; (2) if additional DC power is needed to run the AC and DC loads, pull power from the solar panels; (3) if required, pull all available DC power from all solar panels at its maximum power point (MPP); (4) when the sun and wind cannot supply sufficient DC power for the inverter to run the AC and DC loads, pull power from the battery set; (5) charge the battery if there is excess DC power from the solar panels and/or wind generator; (6) charge the battery using DC power directly from the wind generator; and (7) when sufficient DC power is available from solar panels and wind generator, gradually stop pulling power from the battery set.

For product implementation, the inverters in the embodiments herein can be designed to include the following capabilities: (1) be able to select and pull power from available DC sources based on certain criteria; (2) be able to combine all available. DC power from solar, wind, and battery to meet the production demand to run the connected AC and DC loads; (3) be able to charge batteries using wind power directly so that battery charging does not affect the inverter operations and its maximum power capacity; and (4) implement the DC source selection criteria in computer software, which is configurable to achieve desirable functions for a specific application.

The function of regulating AC output voltage for the off-grid DC source flexible power inverter is achieved by the digital microcontroller with its supporting circuits and software to perform the following: (1) measuring the AC output voltage in real-time; (2) comparing it with the rated AC output voltage setpoint such as 120V; and (3) adjusting the AC output current or output power until the output voltage is regulated around its setpoint within a specified deadband. More specifically; if the AC output voltage is higher than its setpoint, the microcontroller will reduce the output current by decreasing the duty-cycle of the pulse-width-modulation (PWM) of the DC converter. If the AC output voltage is lower than its setpoint, it will increase the duty-cycle of PWM to increase the AC output current. If the AC output voltage is within the deadband of its setpoint such as 120V+/−1V, the microcontroller will not make PWM duty-cycle adjustments to keep the AC output current and AC output power stable. Based on the Ohm's Law, the AC output voltage is in proportion of the AC output current so that it can be regulated accordingly. The function of regulating AC output voltage for the on/off-grid power inverter in its off-grid mode described in FIGS. 8 and 9 works the same way.

Since the disclosed DC source flexible power inverters are used for solar and wind power applications, the available DC input power from each input channel will vary due to sunlight and wind speed variations. On the other hand, the total AC loads may change quickly and frequently. The automatic control system to regulate the inverter's output voltage for off-grid applications can be difficult to implement. The Model-Free Adaptive (MFA) controllers described in U.S. Pat. Nos. 6,055,524, 6,556,980, 7,142,626, 7,152,052, 7,415,446 and 8,594,813, the contents of all of which are hereby incorporated by reference, are implemented in the microcontroller to achieve robust control performance for AC output voltage regulation.

In the embodiments herein, the function of regulating DC output voltages for the external power supply is achieved by the microcontroller with its supporting circuits and software. The useful DC outputs may include the following: (1) 5V DC for small devices and phone chargers, (2) 12V DC for shop tools, and (3) 24V DC for instruments.

FIG. 12 is a block diagram illustrating a m+1 channel off-grid DC source flexible power inverter that is connected to m solar panels and a battery set through corresponding DC input channels, according to an embodiment of this invention.

The inverter comprises in DC selector and converter circuits 481, 482, ..., 484, a DC power combiner and splitter 486, a DC-AC inverter 488, a load interface circuit 490, an internal off-grid AC powerline 492, a load detector 494, a digital microcontroller 496, a line sensing circuit 498, an antenna for wireless communications 500, a wireless LAN module 502, an internal DC power supply 504, an external off-grid AC powerline 506 and 507, a charge controller 508, an external DC power supply 509, and DC output circuits 510.

During normal operating conditions, the power from solar panels 471, 472, 474 is delivered to the corresponding DC selector and converter 481, 482, ..., 484 respectively. The power from battery 476 can enter the DC selector and converter 481, 482, ..., 484 simultaneously as its DC output is connected to each of the converters in parallel. Each DC selector and converter 481, 482, ..., 484 is controlled by the microcontroller 496 and can select one or more DC sources from solar and battery depending on the DC selection criteria. Each DC selector and converter can pull power from the selected DC sources and combine the power. It then splits the DC power into a high-voltage (HV) and a low-voltage (LV) output. These 2 outputs are connected to the DC power combiner and splitter 486.

This is an off-grid DC source flexible power inverter that has both AC and DC outputs to run connected AC and DC loads, yet it has only solar and battery as DC sources. As an example, it can be designed to include the following functions: (1) If required, pull all available DC power from all solar panels at its maximum power point (MPP); (2) when the sun cannot supply sufficient DC power for the inverter to run the AC and DC loads, pull power from the battery; (3) charge the battery if there is excess DC power from the solar panels; and (4) when sufficient DC power is available from solar panels, gradually stop pulling power from the battery.

Compared with the m+2 channel off-grid inverter in FIG. 11, the m+1 channel off-grid inverter in FIG. 12 does not include a wind input channel, but works similarly. Another difference is that the inverter in FIG. 11 has powerline communications, and the inverter in FIG. 12 has wireless communications.

FIG. 12 also illustrates that the same external off-grid AC powerline can have 2 pairs of AC wires 506 and 507 connected in parallel to facilitate AC input and output ports for daisy-chaining multiple off-grid power inverters. The smart and scalable off-grid power inverters have been described in the U.S. patent application Ser. No. 13/493,622, where multiple off-grid inverters can work together as a group, in which an AC master inverter is the "leading inverter" to generate AC power to the off-grid AC powerline to allow the other off-grid inverters connected to the same AC powerline to synchronize with the AC power being produced by the AC master inverter.

FIG. 13 is a block diagram illustrating a m+1 channel DC source flexible on-grid power inverter that is connected to m solar panels and a battery set through corresponding DC input channels, according to an embodiment of this invention.

The inverter comprises m DC selector and converter circuits 521, 522, ..., 524, a DC power combiner and splitter 526, a DC-AC inverter 528, a load interface circuit 530, an internal on-grid AC powerline 532, a solid state switch 534, a digital microcontroller 536, a line sensing circuit 538, an interface circuit for powerline communications 540, a powerline communications Modem 541, an antenna for wireless communications 542, a wireless LAN module 543, an internal DC power supply 544, an external on-grid AC powerline 546, and a charge controller 548.

During normal operating conditions, the power from solar panels 511, 512, ..., 514 is delivered to the corresponding DC selector and converter 521, 522, 524 respectively. The power from battery 516 can enter the DC selector and converter 521, 522, ..., 524 simultaneously as its DC output is connected to each of the converters in parallel. Each DC selector and converter 521, 522, ..., 524 is controlled by the microcontroller 536 and can select one or more DC sources from solar and battery depending on the DC selection criteria. Each DC selector and converter can pull power from the selected DC sources and combine the power. It then splits the DC power into a high-voltage (HV) and a low-voltage (LV) output. These 2 outputs are connected to the DC power combiner and splitter 526.

Compared with the m+2 channel off-grid inverter in FIG. 10, the m+1 channel off-grid inverter in FIG. 13 does not include a wind input channel, but works similarly. Another difference is that the inverter in FIG. 10 has powerline communications, and the inverter in FIG. 13 has both powerline and wireless communications. Since this is an on-grid solar power system with energy storage batteries, it is well suited to provide grid power stabilization services.

FIG. 14 is a block diagram illustrating a m+1 channel DC source flexible on-grid power inverter that is connected to m solar panels and a wind generator through corresponding DC input channels, according to an embodiment of this invention.

The inverter comprises m DC selector and converter circuits 561, 562, ..., 564, a DC power combiner and splitter 566, a DC-AC inverter 568, a load interface circuit 570, an internal on-grid AC powerline 572, a solid state switch 574, a digital microcontroller 576, a line sensing circuit 578, an antenna for wireless communications 580, a wireless LAN module 582, an internal DC power supply 584, and an external on-grid AC powerline 586.

During normal operating conditions, the power from solar panels 551, 552, ..., 554 is delivered to the corresponding DC selector and converter 561, 562, . . . , 564 respectively. The power from a wind generator 558 can enter the DC selector and converter 561, 562, . . . , 564 simultaneously as its DC output is connected to each of the converters in parallel. Each DC selector and converter 561, 562, . . . , 564 is controlled by the microcontroller 576 and can select one or more DC sources from solar and wind generator depending on the DC selection criteria. Each DC selector and converter can pull power from the selected DC sources and combine the power. It then splits the DC power into a high-voltage (HV) and a low-voltage (LV) output. These 2 outputs are connected to the DC power combiner and splitter 566.

This m+1 channel on-grid inverter works similarly to the on-grid inverters described in FIGS. 10 and 13. However, since it does not include batteries, the system is relatively simple. The DC source selection criteria can be designed based on the objective to reduce wear and tear for the wind generator in the following: (1) pull all available DC power from all solar panels at its maximum power point (MPP); (2) supply additional DC power from the wind generator to allow the inverter to work at its peak AC power generation state; and (3) in low irradiance conditions, stop pulling power from the solar panels so that the DC from solar panels is able to supply sufficient DC power for the internal electronics to keep the inverter running, and then pull power from the wind generator when it has sufficient wind speed and produce AC to be sent to the grid.

A method and apparatus for maximizing power production for solar power systems when there is low sunlight is disclosed in the U.S. patent application Ser. No. 13/789,637. A multiple-channel solar power inverter can work in a low power mode when there is low sunlight. The inverter dedicates one solar panel to supply DC power to keep the inverter running allowing the inverter to pull power from other solar panels for AC power generation. The described m+1 channel on-grid power inverter can work well in this situation. Since wind is random and the wind speed can reduce to zero frequently, keeping the power inverter running can significantly improve the harvest of wind energy. Based on the UL1741 standard, an on-grid solar or wind inverter is required to wait 5 minutes before it can send power to the grid. When the wind speed goes to zero, an inverter with only a wind generator as DC source will be forced to shutdown. When there is sufficient wind, it will still have to wait for 5-minutes, causing power generation loss. For this reason, the multi-channel DC flexible power inverters disclosed in this patent can also be useful for large wind generators by adding solar panels and batteries to keep the power inverter running regardless of the wind speed.

FIG. 15 is a block diagram illustrating a DC selector and converter mechanism, according to an embodiment of this invention. It details the design for each DC selector and converter illustrated in FIGS. 8 to 14.

The DC selector and converter mechanism 600 comprises a sensing & selection circuit 602 that takes DC power from a wind generator, a sensing & selection circuit 604 that takes DC power from a solar panel, a sensing & selection circuit 606 that takes DC power from a battery set 614, a DC source combiner 608 that combines the DC power from all sensing & selection circuits, and a DC-DC boost converter that can boost the input DC voltage to a higher output voltage. The DC source combiner has 2 outputs, one of which enters the DC-DC boost converter 618, and the other is the low-voltage (LV) output. The DC-DC boost converter provides the high-voltage (HV) output for the DC selector and converter mechanism 600.

During normal operating conditions, the power from the wind generator 610, solar panel 612, and battery set 614 can enter the DC selector and converter mechanism 600 individually or simultaneously depending on the DC source selection and power pulling criteria implemented in the software in the digital microcontroller 616.

FIG. 16 is a block diagram illustrating a portion of a m+2 channel DC source flexible power inverter with more detailed illustration for a DC power combiner and splitter mechanism, according to an embodiment of this invention. The DC power combiner and splitter mechanism 660 in FIG. 16 details the design for the DC power combiner and splitter illustrated in FIGS. 8 to 14.

In FIG. 16, the m+2 channel DC source flexible power inverter shows that it comprises m DC selector and converter circuits 651, 652, . . . , 654, a DC power combiner and splitter 660, a digital microcontroller 664, a DC-AC inverter 666, an external DC power supply 668, an internal DC power supply 670, and a charge controller 672. The DC power combiner and splitter 660 further comprises a high-voltage (HV) combiner 656, and low-voltage (LV) combiner 658, and a voltage splitter 662.

During normal operating conditions, the power from solar panels 641, 642, . . . , 644 is delivered to the corresponding DC selector and converter 651, 652, . . . , 654 respectively. The power from wind generator 648 can enter the DC selector and converter 651, 652, . . . , 654 simultaneously as the wind generator's DC output is connected to each of the converters in parallel. The power from the battery set 646 can also enter the DC selector and converter 651, 652, . . . , 654 simultaneously as its DC output is connected to each of the converters in parallel. The HV and LV outputs from each DC selector and converter 651, 652, . . . , 654 enter the high-voltage (HV) combiner 656 and low-voltage (LV) combiner 658, respectively. The high-voltage (HV) combiner 656 combines all high-voltage DC inputs and supplies the resulting DC to the DC-AC inverter 666 to produce high voltage AC power. The low-voltage (LV) combiner 658 combines all low-voltage DC inputs and supplies the resulting DC to the voltage splitter 662. Based on the requirements from the external DC power supply 668, internal DC power supply 670, and battery charge controller 672, the voltage splitter 662 can supply the corresponding DC power with the appropriate voltage and current.

FIG. 17 is a block diagram illustrating a battery charge controller with one or multiple DC inputs, according to an embodiment of this invention. The charge controller 680 in FIG. 17 details the design for the charge controller illustrated in FIGS. 8 to 14. It comprises a DC selector 682 that can take DC power from the wind generator 292, and a DC selector 684 that can take DC power from the low-voltage DC output of the DC power combiner and splitter 694. The selected DC power enters the battery charger 686 to charge the battery 696. The DC selectors 682, 684 and the battery charger are controlled by the microcontroller 690 for DC selection and battery charging operations.

In the embodiments herein, the DC selector and combiner mechanism, the DC power combiner and splitter, as well as the battery charge controller can be implemented using one or more known combinations of conventional electronic components such as resisters, capacitors, inductors, sensing circuits, solid-state switches, transformers, diodes, transistors, operational amplifiers, ceramic filters and integrated circuits (ICs), etc.

The applying organization of this patent has built commercial 4-channel on-grid power inverters for on-grid applications, 4-channel off-grid power inverters for off-grid applications, and 4-channel on/off-grid power inverters for applications where grid power is not stable. The described grid and DC source flexible power generation systems and supporting on-grid, off-grid, and on/off-grid DC source flexible power inverters take the unique design and concept of multi-channel power inverters to the next level.

Since both AC and DC are flexible in this design, the possible number of combinations of AC and DC outputs as well as DC sources is large. The following table summarizes the possible power inverter configurations. For instance, the m+2 channel on/off-grid DC flexible power inverter described in FIG. 2 has solar, wind, and battery DC sources, and can produce AC power to the grid or an off-grid circuit, and can also charge the connected battery. So, it is type 11d in the table.

| | | Inputs - DC Source | | | |
|---|---|---|---|---|---|
| No | Outputs | a Solar | b Solar + Wind | c Solar + Battery | d Solar + Wind + Battery |
| 1 | On-Grid AC | Yes | Yes | Yes | Yes |
| 2 | On-Grid AC with DC Output | Yes | Yes | Yes | Yes |
| 3 | On-Grid AC with Battery Charging | No | No | Yes | Yes |
| 4 | On-Grid AC with DC Output and Battery Charging | No | No | Yes | Yes |
| 5 | Off-Grid AC | Yes | Yes | Yes | Yes |
| 6 | Off-Grid AC with DC Output | Yes | Yes | Yes | Yes |
| 7 | Off-Grid AC with Battery Charging | No | No | Yes | Yes |
| 8 | Off-Grid AC with DC Output and Battery Charging | No | No | Yes | Yes |
| 9 | On/Off-Grid AC | Yes | Yes | Yes | Yes |
| 10 | On/Off-Grid AC with DC Output | Yes | Yes | Yes | Yes |
| 11 | On/Off-Grid AC with Battery Charging | No | No | Yes | Yes |
| 12 | On/Off-Grid AC with DC Output and Battery Charging | No | No | Yes | Yes |

The table shows 36 types of possible combinations. In addition, more design variations may include the following: (1) daisy-chained and/or combined parallel AC connections among the inverters, (2) the number and different types of inverters connected to form a group, (3) powerline and/or wireless communications, (4) supported size and voltage range of solar panels, wind generators, and batteries, (5) AC voltage and frequency of the AC output power based on specific electric standard, and (6) voltages and power that the external DC power supply can support.

Although the possible variations of the flexible power inverter design are many, the actual implementation of commercial products can be done using standard electronic components, cables, connectors, hardware jumpers or switches, and computer software making the configuration user-friendly. This design demonstrates the innovation of delivering flexible, cost-effective, and user-friendly power generation systems to harvest any form of renewable energy available and convert it to usable electricity for everyone but especially for those people in need.

The invention claimed is:
1. An on/off-grid DC source flexible power inverter, comprising:

a) multiple DC input ports constructed and arranged to be connected to multiple DC sources including at least one photovoltaic solar panel, at least one wind generator, or at least one battery, or any combination thereof;
b) an on-grid AC output port constructed and arranged to be connected to an electric grid;
c) an off-grid AC output port constructed and arranged to be connected to an off-grid AC circuit;
d) a DC-AC inverter constructed and arranged to receive DC power from one or multiple DC input ports based on pre-defined DC source selection criteria, invert the DC power to AC power, and supply AC power through said on-grid AC output port to the electric grid in on-grid mode when grid is on, or supply AC power through said off-grid AC output port to power AC loads in the off-grid AC circuit in off-grid mode when grid is down;
e) for each AC output port, an internal AC powerline that conducts the AC power from the DC-AC inverter to the electric grid or to corresponding AC loads through an external AC powerline;
f) for each AC output port, an electric relay arranged to isolate the internal AC powerline from the external AC powerline;
g) for each DC input port, a DC selector and converter arranged to select and pull power from one or more DC sources from solar, wind, or battery depending on pre-determined DC selection criteria and split the DC power into a high-voltage (HV) output and a low-voltage (LV) output;
h) a DC power combiner and splitter that combines the high-voltage (HV) and low-voltage (LV) DC power from the DC selector and converter of all DC input ports and supplies LV DC power to an internal DC power supply, an external DC power supply, and a battery charge controller, and supplies HV DC power to the DC-AC inverter;
i) a load interface circuit connected to the DC-AC inverter and to the internal AC powerlines, said load interface circuit being arranged to filter high-frequency components out of the DC-AC inverter's AC output;
j) a load detector connected to the internal and external AC powerlines for the off-grid AC output port, and arranged to detect the impedance of the connected AC loads;
k) a digital microcontroller connected to the DC selector and converter of all DC input ports, DC-AC inverter, load interface circuit, electric relays of the AC output ports, and load detector, said digital microcontroller arranged for (i) monitoring the DC input voltage from solar, wind, and battery; (ii) selecting the DC sources based on the DC source selection criteria; (iii) monitoring the DC voltages in each of the DC selector and converter circuits; (iv) controlling the outputs of each of the DC selector and converter circuits; (v) measuring the input voltage and current, and calculating DC input power for each input channel; (vi) performing maximum power point tracking (MPPT) for each solar panel; (vii) controlling the DC-AC inverter, AC power synchronization, and AC output current; (viii) monitoring AC current and voltage for generated power amount and status; (ix) performing wireless communications; (x) performing logic controls such as AC powerline switching and isolation; (xi) detecting off-grid AC circuit status; (xii) switching between on-grid mode and off-grid mode depending on the grid condition, and (xiii) regulating AC output voltage when in off-grid mode;
l) an antenna for wireless communications and a wireless local area network (LAN) module connected to the digital microcontroller arranged to establish a 2-way digital signal communication between the digital microcontroller and the outside;
m) a line sensing circuit connected to the AC powerlines and the digital microcontroller, and arranged to detect when there is AC power on the powerlines, and measure the AC output voltage and current as real-time feedback signals for the DC-AC inverter to regulate the AC output voltage when working in off-grid mode;
n) an internal DC power supply connected to the DC power combiner and splitter arranged to supply DC power to the flexible power inverter;
o) an external DC power supply connected to the DC power combiner and splitter arranged to supply DC power to one or multiple DC loads; and
p) a charge controller configured to receive DC power from the DC power combiner and splitter or from a wind generator directly to charge batteries.

2. The on/off-grid DC source flexible power inverter of claim 1 further comprising an on-grid AC input port coupled with the on-grid AC output port.

3. The on/off-grid DC source flexible power inverter of claim 1, in which the on-grid output and off-grid output of the on/off-grid DC source flexible power inverter is single-phase AC.

4. The on/off-grid DC source flexible power inverter of claim 1, in which the on-grid output and off-grid output of the on/off-grid DC source flexible power inverter is three-phase AC.

5. The on/off-grid DC source flexible power inverter of claim 1, in which the digital microcontroller includes Model-Free Adaptive (MFA) controllers that control the DC selector and converter of all DC input ports, control AC output current in on-grid mode, and regulate the AC output voltage in off-grid mode, and MFA optimizers that provide maximum power point tracking (MPPT) to allow the flexible power inverter to achieve optimal power production.

6. The on/off-grid DC source flexible power inverter of claim 1, further comprising a 3-position manual switch arranged to select the flexible power inverter to work in the following positions:
  (a) auto position, where the digital microcontroller switches between the on-grid mode and off-grid mode automatically based on the grid condition;
  (b) on-grid mode, where the flexible power inverter works as an on-grid inverter to supply power to the grid through its on-grid output port; and
  (c) off-grid mode, where the flexible power inverter works as an off-grid to supply power to AC loads through its off-grid output port.

7. An on-grid DC source flexible power inverter, comprising:
  a) multiple DC input ports constructed and arranged to be connected to multiple DC sources including at least one photovoltaic solar panel, at least one wind generator, or at least one battery, or any combination thereof;
  b) an on-grid AC output port constructed and arranged to be connected to an electric grid;
  c) a DC-AC inverter constructed and arranged to receive DC power from one or multiple DC input ports based on pre-defined DC source selection criteria, invert the DC power to AC power, and supply AC power through said on-grid AC output port to the electric grid;
  d) for the on-grid AC output port, an internal AC powerline that conducts the AC power from the DC-AC inverter to the electric grid through an external AC powerline;
  e) for the on-grid AC output port, a solid state switch arranged to isolate the internal AC powerline from the external AC powerline;
  f) for each DC input port, a DC selector and converter arranged to select and pull power from one or more DC sources from solar, wind, or battery depending on pre-determined DC selection criteria and split the DC power into a high-voltage (HV) output and a low-voltage (LV) output;
  g) a DC power combiner and splitter that combines the high-voltage (HV) and low-voltage (LV) DC power from the DC selector and converter of all DC input ports and supplies LV DC power to an internal DC power supply, an external DC power supply, and a battery charge controller, and supplies HV DC power to the DC-AC inverter;
  h) a load interface circuit connected to the DC-AC inverter and to the internal AC powerlines, said load interface circuit being arranged to filter high-frequency components out of the DC-AC inverter's AC output;
  i) a digital microcontroller connected to the DC selector and converter of all DC input ports, DC-AC inverter, load interface circuit, and solid state switch, said digital microcontroller arranged for (i) monitoring the DC input voltage from solar, wind, and battery; (ii) selecting the DC sources based on the DC source selection criteria; (iii) monitoring the DC voltages in each of the DC selector and converter circuits; (iv) controlling the outputs of each of the DC selector and converter circuits; (v) measuring the input voltage and current, and calculating DC input power for each input channel; (vi) performing maximum power point tracking (MPPT) for each solar panel; (vii) performing DC-AC inversion, AC power synchronization, and AC output current control; (viii) monitoring AC current and voltage for generated power amount and status; (ix) performing powerline or wireless communications; and (x) performing logic controls such as AC powerline switching and isolation;
  j) a powerline modem connected to the digital microcontroller and internal AC powerlines through an interface circuit arranged to establish a 2-way digital signal communication between the digital microcontroller and the outside world through the external AC powerline;
  k) a line sensing circuit connected to the AC powerlines and the digital microcontroller, and arranged to detect when there is AC power on the powerlines;
  l) an internal DC power supply connected to the DC power combiner and splitter arranged to supply DC power to the power inverter; and
  m) a charge controller configured to receive DC power from the DC power combiner and splitter or from a wind generator directly to charge batteries.

8. The on-grid DC source flexible power inverter of claim 7 further comprising an on-grid AC input port coupled with the on-grid AC output port.

9. The on-grid DC source flexible power inverter of claim 7, in which the output of the power inverter is single-phase AC or three-phase AC.

10. An off-grid DC source flexible power inverter, comprising:

a) multiple DC input ports constructed and arranged to be connected to multiple DC sources including at least one photovoltaic solar panel, at least one wind generator, or at least one battery, or any combination thereof;

b) an off-grid AC output port constructed and arranged to be connected to an off-grid AC circuit;

c) a DC-AC inverter constructed and arranged to receive DC power from one or multiple DC input ports based on pre-defined DC source selection criteria, invert the DC power to AC power, and supply AC power through the AC output port to AC loads connected to the off-grid AC circuit;

d) for the AC output port, an internal AC powerline that allows generated AC power to be sent to corresponding AC loads through an external AC powerline;

e) for each DC input port, a DC selector and converter arranged to select and pull power from one or more DC sources from solar, wind, or battery depending on pre-determined DC selection criteria and split the DC power into a high-voltage (HV) output and a low-voltage (LV) output;

f) a DC power combiner and splitter that combines the high-voltage (HV) and low-voltage (LV) DC power from the DC selector and converter of all DC input ports and supplies LV DC power to an internal DC power supply, an external DC power supply, and a battery charge controller, and supplies HV DC power to the DC-AC inverter;

g) a load interface circuit connected to the DC-AC inverter and to the internal AC powerlines, said load interface circuit being arranged to filter high-frequency components out of the DC-AC inverter's AC output;

h) a load detector connected to the internal and external AC powerlines, and arranged to detect the impedance of the connected AC loads;

i) a digital microcontroller connected to the DC selector and converter of all DC input ports, DC-AC inverter, load interface circuit, and load detector, said digital microcontroller arranged for (i) monitoring the DC input voltage from solar, wind, and battery; (ii) selecting the DC sources based on the DC source selection criteria; (iii) monitoring the DC voltages in each of the DC selector and converter circuits; (iv) controlling the outputs of each of the DC selector and converter circuits; (v) measuring the input voltage and current, and calculating DC input power for each input channel; (vi) performing maximum power point tracking (MPPT) for each solar panel; (vii) performing DC-AC inversion, AC power synchronization, and AC output current control; (viii) monitoring AC current and voltage for generated power amount and status; (ix) performing powerline or wireless communications; (x) performing logic controls such as AC powerline switching and isolation; (xi) detecting off-grid AC circuit status; and (xii) regulating AC output voltage;

j) an antenna for wireless communications and a wireless local area network (LAN) module connected to the microcontroller arranged to establish a 2-way digital signal communication between the digital microcontroller and the outside;

k) a line sensing circuit connected to the AC powerlines and the digital microcontroller, and arranged to detect when there is AC power on the powerlines, and measure the AC output voltage and current as real-time feedback signals for the inverter to regulate the AC output voltage;

l) an internal DC power supply connected to the DC power combiner and splitter arranged to supply DC power to the power inverter;

m) an external DC power supply connected to the DC power combiner and splitter arranged to supply DC power to one or multiple DC loads; and n) a charge controller configured to receive DC power from the DC power combiner and splitter or from a wind generator directly to charge batteries.

11. The off-grid DC source flexible power inverter of claim 10 further comprising an off-grid AC input port coupled with the off-grid AC output port.

12. The off-grid DC source flexible power inverter of claim 10, further comprising:

a) a DC power supply coupled to one or multiple DC input ports; and b) one or multiple DC output ports coupled to the DC power supply to supply) power to DC loads.

13. The off-grid DC source flexible power inverter of claim 10, in which the output of the power inverter is single-phase AC or three-phase AC.

* * * * *